US012812587B2

(12) United States Patent
Shin et al.

(10) Patent No.: US 12,812,587 B2

(45) Date of Patent: Nov. 24, 2026

(54) METHOD AND APPARATUS FOR SIDELINK POSITIONING IN WIRELESS COMMUNICATION SYSTEM

(71) Applicant: Samsung Electronics Co., Ltd., Gyeonggi-do (KR)

(72) Inventors: Cheolkyu Shin, Gyeonggi-do (KR); Youngbum Kim, Gyeonggi-do (KR); Hyunseok Ryu, Gyeonggi-do (KR); Kyoungmin Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 313 days.

(21) Appl. No.: 18/470,944

(22) Filed: Sep. 20, 2023

(65) Prior Publication Data

US 2024/0107490 A1 Mar. 28, 2024

(30) Foreign Application Priority Data

Sep. 21, 2022 (KR) ........................ 10-2022-0119100

(51) Int. Cl.

*H04W 64/00* (2009.01)
*H04L 1/00* (2006.01)
*H04L 5/00* (2006.01)
*H04W 92/18* (2009.01)

(52) U.S. Cl.

CPC ........... *H04W 64/00* (2013.01); *H04L 1/0061* (2013.01); *H04L 5/0051* (2013.01); *H04W 92/18* (2013.01)

(58) Field of Classification Search

CPC .... H04W 64/00; H04W 92/18; H04L 1/0061; H04L 5/0051; H04L 1/0026; H04L 5/0053

(Continued)

(56) References Cited

U.S. PATENT DOCUMENTS

2022/0065979 A1 3/2022 Bao et al.
2022/0239438 A1 7/2022 Cha et al.

(Continued)

FOREIGN PATENT DOCUMENTS

EP 3 944 545 1/2022
EP 4 585 008 7/2025

(Continued)

OTHER PUBLICATIONS

3GPP TS 38.211 V17.2.0 (Jun. 2022), pp. 136.

(Continued)

*Primary Examiner* — Hirdepal Singh

(74) *Attorney, Agent, or Firm* — The Farrell Law Firm, P.C .

(57) ABSTRACT

The disclosure relates to a fifth generation (5G) or sixth generation (6G) communication system for supporting higher data transmission rates. Disclosed is a method performed by a first terminal in wireless communication system supporting SL, including identifying whether an S-PRS sequence ID for generation of an S-PRS is obtained from a higher layer of the first terminal, generating the S-PRS based on the obtained S-PRS sequence ID, in case that the S-PRS sequence ID is obtained from the higher layer of the first terminal, generating the S-PRS sequence ID based on a 12 LSBs of a CRC for a PSCCH associated with the S-PRS, generating the S-PRS based on the generated S-PRS sequence ID, in case that the S-PRS sequence ID is not obtained from the higher layer of the first terminal, and transmitting the generated S-PRS to a second terminal.

15 Claims, 20 Drawing Sheets

(58) Field of Classification Search
USPC ........................................................ 455/456.1
See application file for complete search history.

(56) References Cited

U.S. PATENT DOCUMENTS

| | | | | |
|---|---|---|---|---|
| 2023/0048608 | A1* | 2/2023 | Ren | H04L 5/0053 |
| 2023/0096178 | A1* | 3/2023 | Wu | H04W 72/51 370/329 |
| 2024/0137173 | A1* | 4/2024 | Ganesan | H04L 5/005 |
| 2024/0357543 | A1* | 10/2024 | Yoon | H04W 64/00 |
| 2025/0008537 | A1* | 1/2025 | Sahin | H04W 64/00 |
| 2025/0254702 | A1* | 8/2025 | Ko | H04L 5/0051 |
| 2025/0267681 | A1* | 8/2025 | Takahashi | H04W 64/00 |

FOREIGN PATENT DOCUMENTS

| | | |
|---|---|---|
| WO | WO 2022/059876 | 3/2022 |
| WO | WO 2022/180597 | 9/2022 |
| WO | WO 2023/033520 | 3/2023 |
| WO | WO 2024/172392 | 8/2024 |

OTHER PUBLICATIONS

3GPP TS 38.212 V17.2.0 (Jun. 2022), pp. 201.
Ericsson, “Introduction of expanded and improved NR positioning”, 3GPP TSG-RAN WG1 Meeting #113 R1-2306307 Incheon, Korea, May 22-26, 2023, pp. 4.
Vivo, “Discussion on Potential Solutions for Sidelink Positioning”, R1-2206046, 3GPP TSG RAN WG1 #110, Aug. 22-26, 2022, 16 pages.
International Search Report dated Jan. 11, 2024 issued in counterpart application No. PCT/KR2023/014329, 7 pages.
ETSI TS 138 211, V16.10.0, (Jul. 2022), pp. 138.
European Search Report dated Oct. 24, 2025 Issued in counterpart application No. 23868601.8-1206, 9 pages.

* cited by examiner (a)

| | 2 symbols | 4 symbols | 6 symbols | 12 symbols |
|---|---|---|---|---|
| Comb-2 | {0,1} | {0,1,0,1} | {0,1,0,1,0,1} | {0,1,0,1,0,1,0,1,0,1,0,1} |
| Comb-4 | NA | {0,2,1,3} | NA | {0,2,1,3,0,2,1,3,0,2,1,3} |
| Comb-6 | NA | NA | {0,3,1,4,2,5} | {0,3,1,4,2,5,0,3,1,4,2,5} |
| Comb-12 | NA | NA | NA | {0,6,3,9,1,7,4,10,2,8,5,11} |

(b) Comb-2, 2-symbols (c) Comb-2, 4-symbols (d) Comb-2, 6-symbols (e) Comb-2, 12-symbols (f) Comb-4, 4-symbols (g) Comb-4, 12-symbols (h) Comb-6, 6-symbols (i) Comb-6, 12-symbols (j) Comb-12, 12-symbols (a)

| $K_{TC}$ | $k^{0}_{offset}, \ldots, k^{N^{SRS}_{symb}-1}_{offset}$ | | | | |
|---|---|---|---|---|---|
| | $N^{SRS}_{symb}=1$ | $N^{SRS}_{symb}=2$ | $N^{SRS}_{symb}=4$ | $N^{SRS}_{symb}=8$ | $N^{SRS}_{symb}=12$ |
| 2 | 0 | 0, 1 | 0, 1, 0, 1 | - | - |
| 4 | - | 0, 2 | 0, 2, 1, 3 | 0, 2, 1, 3, 0, 2, 1, 3 | 0, 2, 1, 3, 0, 2, 1, 3, 0, 2, 1, 3 |
| 8 | - | - | 0, 4, 2, 6 | 0, 4, 2, 6, 1, 5, 3, 7 | 0, 4, 2, 6, 1, 5, 3, 7, 0, 4, 2, 6 |

(b) Comb-2, 1-symbols
(b) Comb-2, 2-symbols
(c) Comb-2, 4-symbols (f) Comb-4, 2-symbols
(f) Comb-4, 4-symbols
(g) Comb-4, 8-symbols
(h) Comb-4, 12-symbols
(i) Comb-8, 4-symbols
(j) Comb-8, 8-symbols
(k) Comb-8, 12-symbols

METHOD AND APPARATUS FOR SIDELINK POSITIONING IN WIRELESS COMMUNICATION SYSTEM

CROSS REFERENCE TO RELATED APPLICATION

The present application claims priority under 35 U.S.C. § 119 to Korean Patent Application No. 10-2022-0119100, filed in the Korean Intellectual Property Office on Sep. 21, 2022, the entire content of which is incorporated herein by reference.

BACKGROUND

1. Field

The disclosure relates generally to a wireless mobile communication system, and more particularly, to a method and apparatus for performing positioning (location measurement) through a sidelink in the wireless mobile communication system.

2. Description of Related Art

The fifth generation (5G) mobile communication technologies define broad frequency bands enabling high transmission rates and new services, and can be implemented not only in sub 6 gigahertz (GHz) bands such as 3.5 GHz, but also in above 6 GHz bands referred to as millimeter wave (mmWave) including 28 GHz and 39 GHz. It has also been considered to implement 6th generation (6G) mobile communication technologies, referred to as beyond 5G systems, in terahertz (THz) bands such as 95 GHz to 3 THz bands to achieve transmission rates fifty times faster than 5G mobile communication technologies and ultra-low latencies one-tenth of 5G mobile communication technologies.

Since the outset of 5G mobile communication technology development, to support services and to satisfy performance requirements in connection with enhanced mobile broadband (eMBB), ultra reliable low latency communications (URLLC), and massive machine-type communications (mMTC), there has been ongoing standardization regarding beamforming and massive multi input multi output (MIMO) for mitigating radio-wave path loss and increasing radio-wave transmission distances in mmWave, supporting numerologies such as operating multiple subcarrier spacings for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

There are also ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN) which is UE-satellite direct communication for providing coverage in an area in which communication with terrestrial networks is unavailable, and positioning.

There is also ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access channel (RACH) procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, the number of devices that will be connected to communication networks is expected to exponentially increase, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR), 5G performance improvement and complexity reduction by utilizing artificial intelligence (AI) and machine learning (ML), AI service support, metaverse service support, and drone communication.

Such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

To meet the increasing demand with respect to wireless data traffic after the commercialization of 4th generation (4G) communication systems, efforts have been made to develop improved 5G NR systems. Unlike LTE, the 5G communication systems support various subcarrier spacings including 15 kHz, 30 kHz, 60 kHz, and 120 kHz, wherein a physical control channel uses polar coding and a physical data channel uses LDPC. Additionally, not only discrete Fourier transform spread orthogonal frequency division multiplexing (DFT-S-OFDM) but also cyclic prefix OFDM (CP-OFDM) are used as a waveform for uplink transmission. While LTE supports hybrid ARQ (HARQ) retransmission in units of transport blocks (TBs), 5G may additionally support HARQ retransmission based on a code block group (CBG) composed of multiple code blocks (CBs).

To improve system networks for 5G communication systems, various technologies such as evolved small cells, advanced small cells, cloud radio access networks (cloud-RAN), ultra-dense networks, device-to-device communication (D2D), wireless backhaul, vehicle communication network (e.g., V2X), cooperative communication, coordinated multi-points (CoMP), and received-interference cancellation have been developed.

The Internet has evolved from a human-based connection network, where humans create and consume information, to the Internet of things (IoT), where distributed components such as objects exchange information with each other to process the information. Internet of everything (IoE) technology, which is a combination of IoT technology and big data processing technology through connection with a cloud server, etc., is also emerging. To implement the IoT, technology elements such as sensing technology, wired/wireless communication and network infrastructures, service interface technology, and security technology are required, and thus, technologies for inter-object connection, such as sensor network, machine to machine (M2M) communication, or machine-type communication (MTC), have recently been studied. In an IoT environment, intelligent Internet technology (IT) services that collect and analyze data generated by connected objects and create new value in human life may be provided. The IoT may be applied to a variety of areas, such as smart homes, smart buildings, smart cities, smart cars or connected cars, smart grid, health care, smart home appliances, and advanced medical services through convergence and combination between existing information technologies (IT) and various industries.

Accordingly, various attempts have been made to apply 5G communication systems to IoT networks. For example, technologies related to sensor networks, machine to machine (M2M) communication, and machine type communication (MTC) are being implemented by using 5G communication technology including beamforming, MIMO, and array antennas. The application of a cloud RAN as big data processing technology described above may also be considered as an example of convergence of 5G technology and IoT technology. As such, a plurality of services may be provided to a user in a communication system, and a method for providing the plurality of services in the same time domain according to characteristics so as to provide the plurality of services to the user and an apparatus using the method are required. Various services provided by 5G communication systems are being studied. One of these services satisfies the requirements of low latency and high reliability. In addition, the demand for mobile services is ever-increasing, and location-based services (LBSs), which are mainly driven by two main requirements, i.e., emergency services and commercial applications, are rapidly growing. In particular, in communication using a sidelink, an NR sidelink system supports unicast communication, groupcast (or multicast) communication, and broadcast communication between terminals. Unlike LTE sidelinks that aim to transmit and receive basic safety information required for driving a vehicle on a road, NR sidelinks aim to provide more advanced services such as platooning, advanced driving, extended sensor, and remote driving.

In particular, in NR sidelinks, positioning (location measurement) may be performed through a sidelink between terminals. Thus, a method for measuring a location of a terminal by using a positioning signal transmitted through a sidelink may be considered. A conventional method of measuring a location of a terminal by using a positioning signal transmitted through a downlink and an uplink between a terminal and a base station is feasible only when the terminal is within the coverage area of the base station. However, when introducing sidelink positioning, the location of a terminal may be measured even when the terminal is out of a coverage area of a base station. The terminal may transmit a sidelink positioning reference signal (S-PRS) to perform positioning in the sidelink, in which case a sequence generation method for S-PRS may be considered.

Conventionally, however, three is a lack of an S-PRS transmission method that can ensure sound sidelink positioning performance.

Therefore, there is a need in the art to provide a method and apparatus for transmitting an S-PRS in a process of measuring (positioning) a location of a terminal in a sidelink to ensure sound sidelink positioning performance.

SUMMARY

The disclosure has been made to address at least the above-mentioned problems and/or disadvantages and to provide at least the advantages described below.

Accordingly, an aspect of the disclosure is to provide a method and procedure for transmitting a reference signal when a terminal performs positioning (location measurement) through a sidelink, such that positioning can be conducted in the sidelink.

Another aspect of the disclosure is to provide a method for generating a pseudorandom-based sequence and a Zadoff-Chu-based S-PRS sequence and pattern in consideration of a sidelink environment.

Another aspect of the disclosure is to provide a method in which a symbol of a sidelink slot S-PRS can be transmitted, an RE on a frequency axis S-PRS can be transmitted, and an S-PRS can be multiplexed with other channels and signals.

Another aspect of the disclosure is to provide parameters required for transmission of S-PRS, a method for configuring the parameters, and a terminal operation based thereon.

In accordance with an aspect of the disclosure, a method performed by a first terminal in wireless communication system supporting sidelink includes identifying whether an S-PRS sequence ID for generation of an S-PRS is obtained from a higher layer of the first terminal, generating the S-PRS based on the obtained S-PRS sequence ID, in case that the S-PRS sequence ID is obtained from the higher layer of the first terminal, generating the S-PRS sequence ID based on a 12 least significant bits (LSBs) of a cyclic redundancy check (CRC) for a physical sidelink control channel (PSCCH) associated with the S-PRS, generating the S-PRS based on the generated S-PRS sequence ID, in case that the S-PRS sequence ID is not obtained from the higher layer of the first terminal, and transmitting the generated S-PRS to a second terminal.

In accordance with an aspect of the disclosure, a first terminal in wireless communication system supporting sidelink includes a transceiver; and a processor operably coupled with the transceiver and configured to identify whether an S-PRS sequence ID for generation of the S-PRS is obtained from a higher layer of the first terminal, generate the S-PRS based on the obtained S-PRS sequence ID, in case that the S-PRS sequence ID is obtained from the higher layer of the first terminal, generate the S-PRS sequence ID based on 12 least significant bits (LSBs) of a cyclic redundancy check (CRC) for a physical sidelink control channel (PSCCH)

associated with the S-PRS, generate the S-PRS based on the generated S-PRS sequence ID, in case that the S-PRS sequence ID is not obtained from the higher layer of the first terminal, and transmit the generated S-PRS to a second terminal.

In accordance with an aspect of the disclosure, a second terminal in wireless communication system supporting sidelink includes a transceiver and a processor operably coupled with the transceiver and configured to obtain an S-PRS sequence ID for a first terminal, receive an S-PRS from the first terminal, and generate information associated with positioning of the second terminal based on the S-PRS sequence ID and the S-PRS.

BRIEF DESCRIPTION OF THE DRAWINGS

The foregoing and other aspects, features and advantages of certain embodiments of the present disclosure will become more apparent from the following description with reference to the accompanying drawings, in which.

DETAILED DESCRIPTION

Figure 1:
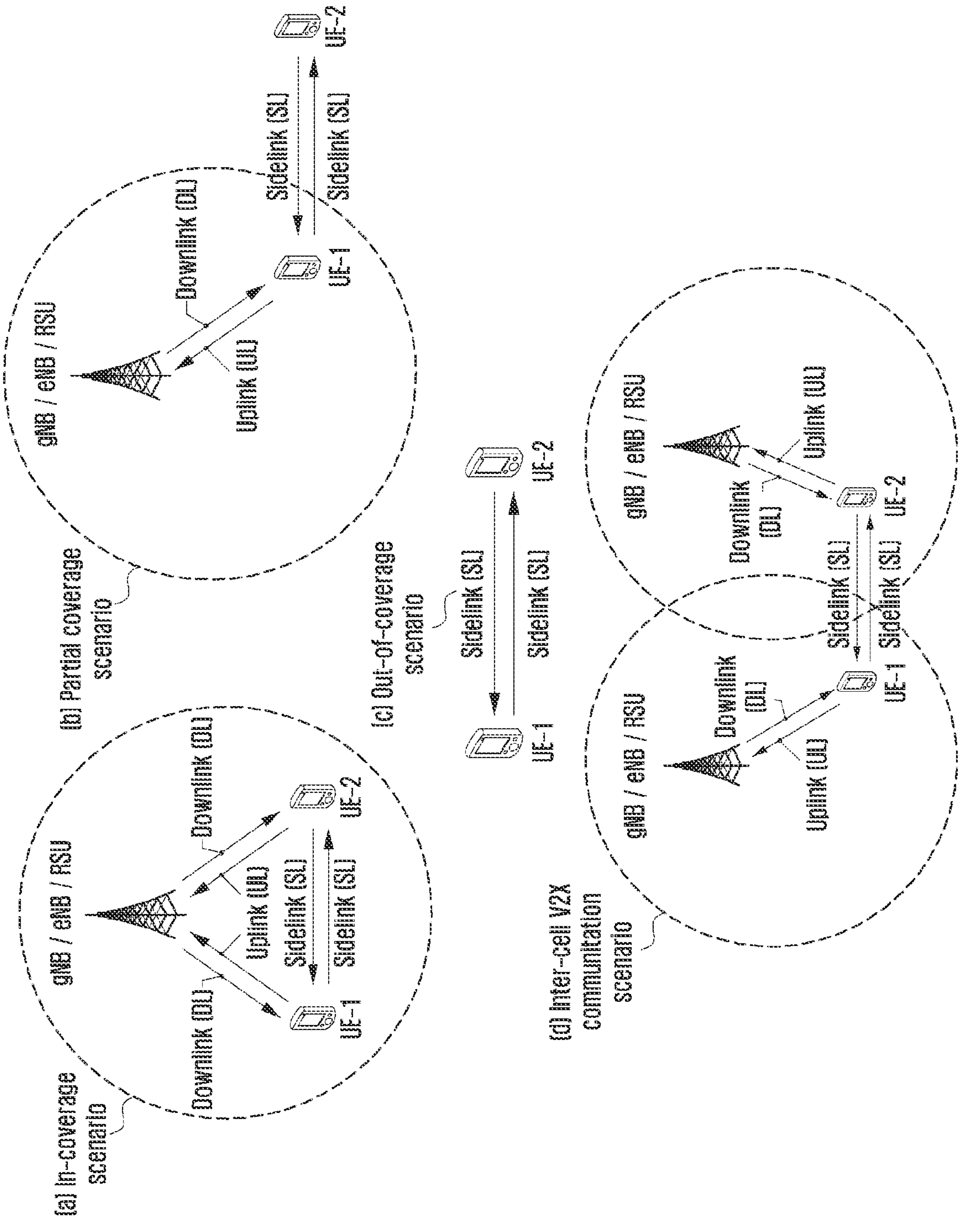
FIG. 1 illustrates a system according to an embodiment.

Hereinafter, embodiments of the disclosure are described in detail with reference to the accompanying drawings. Descriptions of well-known functions and constructions may be omitted for the sake of clarity and conciseness.

Some components in the attached drawings are exaggerated, omitted, or schematically illustrated. In addition, the size of each component may not substantially reflect its actual size. In the drawings, the same or corresponding components are denoted by the same reference numerals.

The advantages and features of the disclosure, and methods of achieving the same, will become apparent with reference to embodiments of the disclosure described below in detail in conjunction with the accompanying drawings. The disclosure may, however, be embodied in many different forms and should not be construed as limited to embodiments set forth herein. The embodiments herein are provided so that this disclosure will be thorough and complete, and will fully convey the scope of the disclosure only defined by the claims to one of ordinary skill in the art. In the specification, the same reference numerals denote the same components.

The term '-unit' used herein refers to a software or hardware component, such as a field programmable gate array (FPGA) or an application specific integrated circuit (ASIC), and '-unit' performs a certain function. However, the term '-unit' is not limited to software or hardware. A '~unit' may be constituted to be in an addressable storage medium or may be constituted to operate one or more processors. Thus, a '-unit' may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and '~units' may be combined into fewer components and '~units' or may be further separated into additional components and '-units'. Components and '~units' may be implemented to operate one or more central processing units (CPUs) in a device or a secure multimedia card. A '-unit' in an embodiment may include one or more processors.

Embodiments of the disclosure are described mainly based on a new radio access network (RAN) (new radio (NR)) on the 5G mobile communication standard specified by the 3d generation partnership project (3GPP) long term evolution that is a standardization organization for mobile communication standards, and a packet core (5G system, 5G core network, or next generation (NG) core) that is a core network. However, it will be obvious to one of ordinary skill in the art that the main subject matter of the disclosure is applicable to other communication systems having a similar technical background, with a slight modification within a range that is not significantly outside the scope of the disclosure.

In the 5G system, a network data collection and analysis function (NWDAF) providing a function of analyzing and providing data collected in a 5G network may be defined to support network automation. The NWDAF may collect/store/analyze information from the 5G network and may provide a result to an unspecified network function (NF), and an analysis result may be independently used by each NF.

For convenience of explanation, some terms and names defined by the 3GPP standard (standard of 5G, NR, LTE, or similar system) may be used. However, the disclosure is not limited by the terms and names, and may be equally applied to systems conforming to other standards.

Also, terms used herein for identifying access nodes, and for denoting network entities, messages, terms interfaces between network entities, and various types of identification information are examples for convenience of explanation. Accordingly, the disclosure is not limited to the terms as herein used, and may use different terms to refer to the items having the same meaning in a technological sense.

FIG. 1 illustrates a system, according to an embodiment.

In FIG. 1, (a) illustrates an example where all terminals, UE-1 and UE-2, performing communication via a sidelink, are located within coverage of a base station (in-coverage (IC)). All of the terminals are able to receive data and control information from the base station through a downlink (DL) or transmit data and control information to a base station through an uplink (UL). The data and control information may be data and control information for sidelink communication. Alternatively, the data and control information may be data and control information for general cellular communication. The terminals may transmit/receive data and control information for corresponding communication via a sidelink (SL).

In FIG. 1, (b) illustrates an example in which, among the terminals, UE-1 is located within the coverage area of the base station and UE-2 is located outside the coverage area of the base station. That is, (b) illustrates a partial coverage (PC) example in which only some terminals (only UE-2) are located outside the coverage area of the base station. UE-1, which is the terminal located within the coverage area of the base station, is able to receive data and control information from the base station through a DL or transmit data and control information to the base station through a UL. UE-2, which is the terminal that is located outside the coverage area of the base station, is unable to receive data and control information from the base station through a DL, and is unable to transmit data and control information to the base station through a UL. UE-2 is able to transmit/receive data and control information for corresponding communication to/from UE-1 through an SL.

In FIG. 1, (c) illustrates an example in which all the terminals are located outside the coverage area of the base station (an out-of-coverage (OOC)). Accordingly, UE-1 and UE-2 are unable to receive data and control information from the base station through a DL, and also is unable to transmit data and control information to the base station through a UL. UE-1 and UE-2 are able to transmit/receive data and control information through an SL.

In FIG. 1, (d) illustrates an example of a scenario in which sidelink communication is performed between UE-1 and UE-2, which are located in different cells. Particularly, (d) illustrates a case in which UE-1 and UE-2 are connected to different base stations (a radio resource control (RRC)-connected state), or UE-1 and UE-2 are camping on the respective base stations (an RRC-disconnected state, i.e., an RRC idle state). In this case, UE-1 may be a transmitting terminal and UE-2 may be a receiving terminal in an SL. Alternatively, UE-1 may be a receiving terminal and UE-2 may be a transmitting terminal in the SL. UE-1 may receive a system information block (SIB) from a base station to which UE-1 is connected (or on which UE-1 camps), and UE-2 may receive an SIB from another base station to which UE-2 is connected (or on which UE-2 camps). In this case, an existing SIB may be used as the SIB, or an SIB separately defined for sidelink communication may be used as the SIB. In addition, information of the SIB received by UE-1 and information of the SIB received by UE-2 may be different from each other. Accordingly, to perform sidelink communication between UE-1 and UE-2 located in different cells, information should be unified, or a method for signaling information thereof and interpreting SIB information transmitted from a different cell may be additionally required.

Although FIG. 1 illustrates an SL system including two terminals, UE-1 and UE-2, for convenience of description, the disclosure is not limited thereto and communication may be performed between more than two terminals. In addition, an interface (a UL and a DL) between a base station and terminals may be referred to as a Uu interface, and an SL communication between terminals may be referred to as a PC5 interface. Therefore, in the disclosure, these terms may be interchangeably used, Meanwhile, a terminal may refer to a general terminal and a terminal supporting V2X. In particular, a terminal may be a handset (e.g., a smart phone) of a pedestrian.

Alternatively, a terminal may include a vehicle that supports vehicle-to-vehicle (V2V) communication, a vehicle that supports vehicle-to-pedestrian (V2P) communication, a vehicle that supports vehicle-to-network (V2N) communication, or a vehicle that supports vehicle-to-infrastructure (V2I) communication. In addition, a terminal may include a road side unit (RSU) equipped with terminal functions, an RSU equipped with base station functions, or an RSU equipped with some of base station functions and some of terminal functions. In addition, according to an embodiment of the disclosure, a base station may support both V2X communication and general cellular communication, or may support only V2X communication. In this case, a base station may be a 5G base station (gNB), a 4G base station (eNB), or an RSU, Therefore, in the disclosure, a base station may also be referred to as an RSU.

Figure 2:
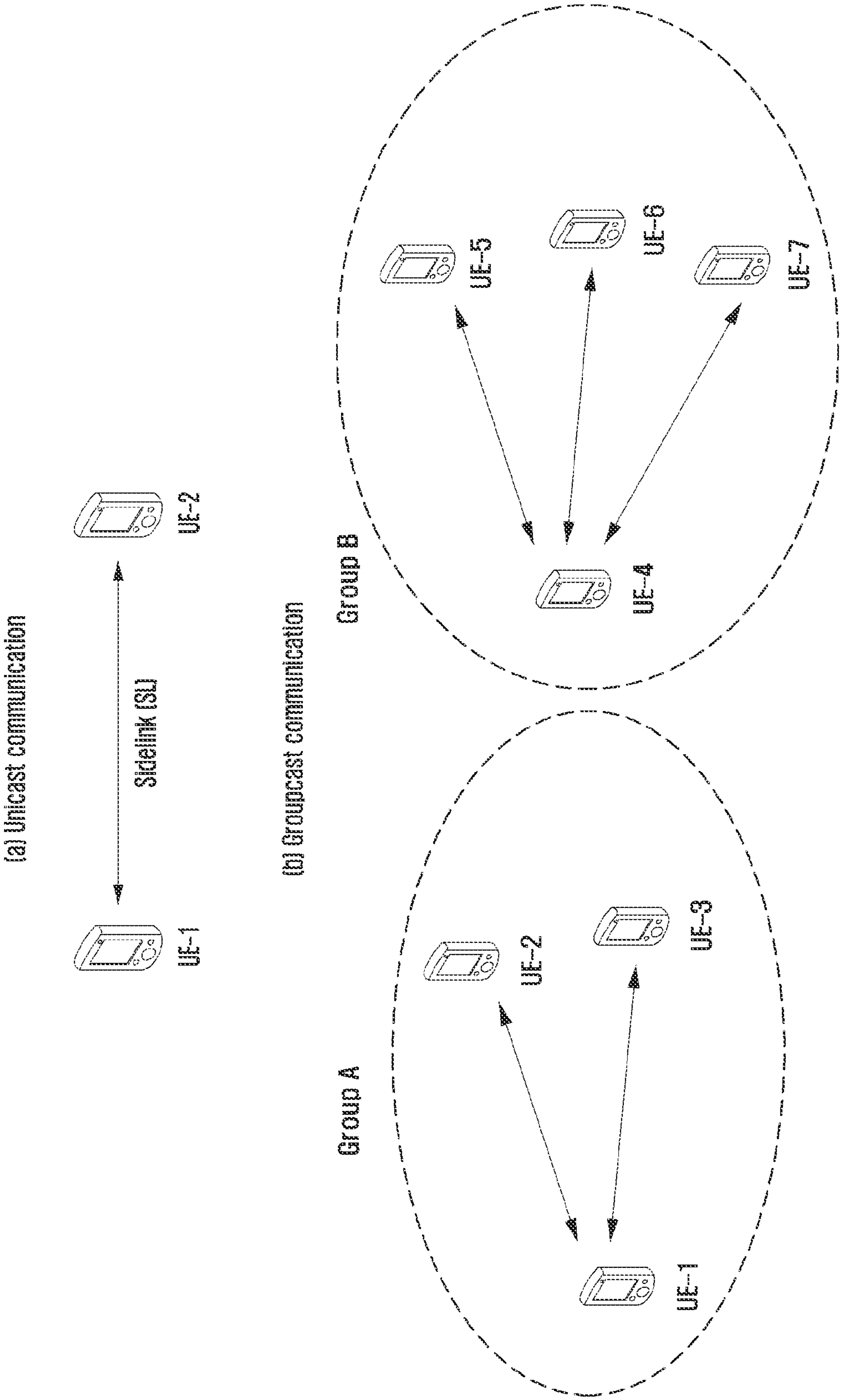
FIG. 2 illustrates a communication method performed through a sidelink, according to an embodiment.

FIG. 2 illustrates a communication method performed via an SL, according to an embodiment.

Referring to (a) of FIG. 2, UE-1 201 (e.g., TX UE) and UE-2 202 (e.g., RX UE) may perform communication in a one-to-one manner, which may be referred to as unicast communication. In an SL, capability information and configuration information may be exchanged between terminals through PC5-RRC defined in a unicast link between the terminals. The configuration information may be exchanged through a medium access control (MAC) control element (CE) defined in the unicast link between the terminals.

Referring to (b) of FIG. 2, a TX UE and a RX UE may perform one-to-many communication, which may be referred to as groupcast or multicast communication. In (b) of FIG. 2, UE-1 211, UE-2 212, and UE-3 213 form one group (group A) to perform groupcast communication and UE-4 214, UE-5 215, UE-6 216, and UE-7 217 form another group (group B) to perform groupcast communication. Each UE may perform groupcast communication only within a group to which it belongs, and may perform communication with a UE present in a different group by using unicast, groupcast, or broadcast. Although two groups (group A and group B) are formed in (b) of FIG. 2, the disclosure is not limited thereto.

Although not illustrated in FIG. 2, UEs may perform broadcast communication in an SL. The broadcast communication refers to a case in which data and control information transmitted by a transmission UE through SLs are received by all other terminals. For example, assuming that, in (b) of FIG. 2, UE-1 211 is a transmission UE for broadcast communication, all UEs (UE-2 212, UE-3 213, UE-4 214, UE-5 215, UE-6-216, and UE-7 217) may receive data and control information transmitted by UE-1 211.

Unlike LTE V2X, NR V2X may consider a support type in which a vehicle UE transmits data only to a specific node via unicast, and a support type in which a vehicle UE transmits data to a plurality of specific nodes via groupcast.

For example, in a service scenario such as platooning that is a technology of grouping and moving two or more vehicles in a form of a group by connecting the two or more vehicles via one network, such unicast and group cast technologies may be useful. In particular, unicast communication may be required for a leader node of a group connected via platooning to control one specific node, and groupcast communication may be required for the leader node to simultaneously control groups including a plurality of specific nodes.

Figure 3:
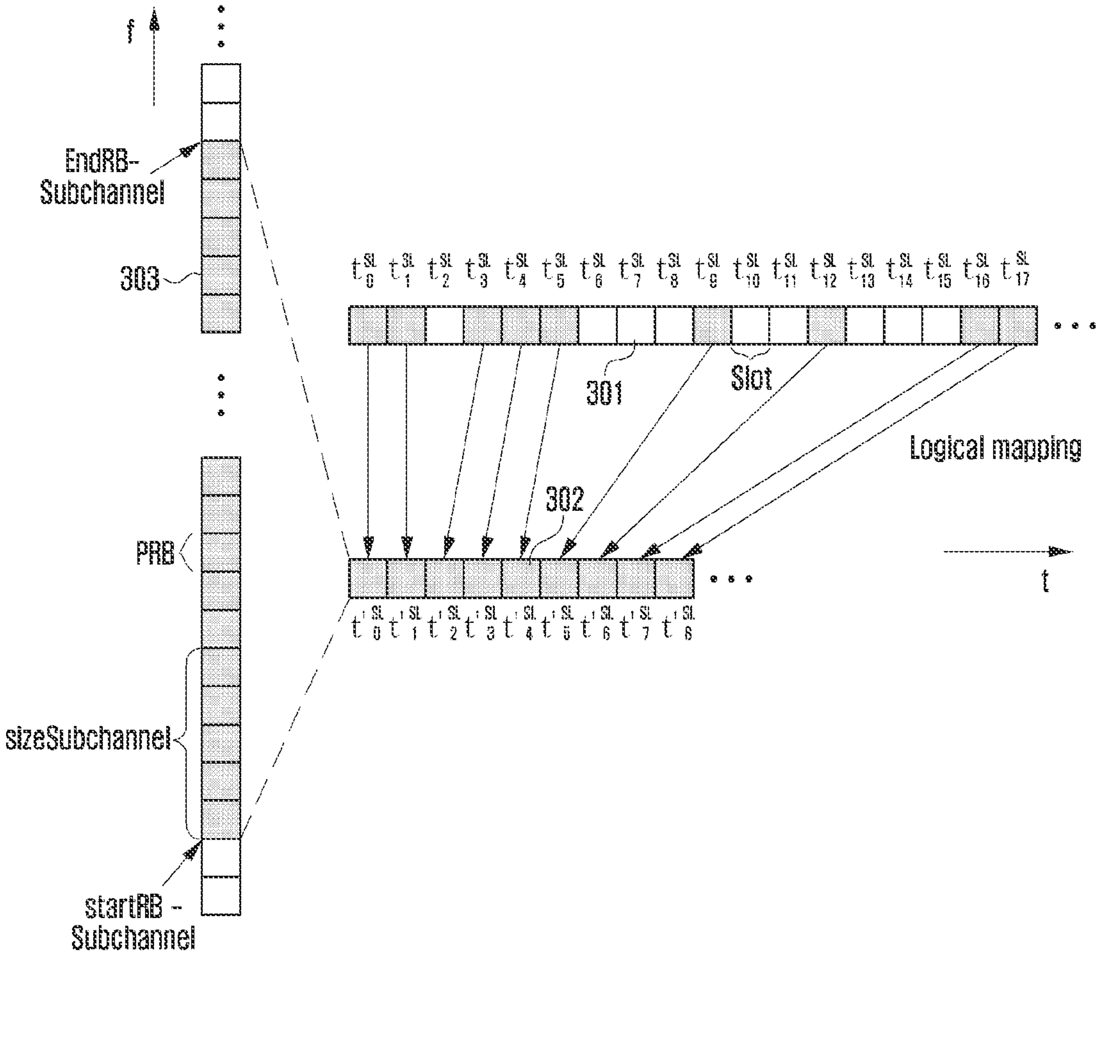
FIG. 3 illustrates a resource pool defined as a set of resources in time and frequency domain used for sidelink transmission and reception, according to an embodiment.

FIG. 3 illustrates a resource pool defined as a set of resources in time and frequency used for sidelink transmission and reception, according to an embodiment. In a resource pool, a resource allocation unit (resource granularity) of a time axis may be a slot. Also, a resource allocation unit of a frequency axis may be a sub-channel including one or more physical resource blocks (PRBs). In the disclosure, an example in which the resource pool is discontinuously allocated on the time axis is described, but a resource pool may be continuously allocated on the time axis. Although, an example in which the resource pool is continuously allocated on the frequency axis is described, a method for discontinuously allocating a resource pool on the frequency axis is not excluded from the disclosure.

In FIG. 3, a case 301 in which a resource pool is discontinuously allocated on the time axis is illustrated. In FIG. 3, a case in which the granularity of resource allocation on the time axis is constituted with slots. First, SL slots may be defined within slots used for a UL. In particular, the length of symbols used for an SL in one slot may be configured in SL bandwidth part (BWP) information. Therefore, among the slots used for the UL, slots in which the length of symbols configured as an SL is not guaranteed are unable to serve as SL slots. In addition, slots in which an SL synchronization signal block (S-SSB) is transmitted are excluded from the slots belonging to the resource pool. With reference to 301, a set of slots that may be used for an SL on the time axis except for such slots is illustrated as $$t_0^{SL}, t_1^{SL}, t_2^{SL}, \ldots$$

The shaded portions in 301 represent SL slots belonging to the resource pool. The SL slots belonging to the resource pool may be (pre-)configured as resource pool information through a bitmap. With reference to 302, the set of the SL slots belonging to the resource pool on the time axis is illustrated as $$t'^{SL}_0, t'^{SL}_1, t'^{SL}_2, \ldots$$

The meaning of (Pre-)configuration as used herein may refer to configuration information, which is pre-configured and then stored in a terminal, or may refer to a case in which a terminal is configured by a base station in a cell-common manner. Here, cell-common may indicate that terminals in a cell receive the same information configuration from a base station. In this case, the terminals may consider a method for receiving an SL-SIB from the base station and obtaining cell-common information. In addition, (pre-)configuration may refer to a case in which a terminal is configured in a UE-specific manner after an RRC connection with a base station is established. Here, UE-specific may be replaced with UE-dedicated, and may indicate that each terminal receives configuration information with a particular value. In this case, the terminal may consider a method for receiving an RRC message from the base station and obtaining UE-specific information. In addition, a method for performing (pre-) configuration in resource pool information, and a method for performing (pre-) configuration not in resource pool information may be considered. When (pre-)configuration is performed in resource pool information, all terminals operating in a corresponding resource pool may operate according to common configuration information, except for the terminals configured in a UE-specific manner after an RRC connection with the base station is established. However, the method for performing (pre-)configuration not in resource pool information is basically to perform the (pre-) configuration independently of the resource pool configuration information. For example, one or more modes may be (pre-)configured in a resource pool (e.g., A, B, and C), and which one of the (pre-)configured modes to use in the resource pool (e.g., A, B, or C) may be indicated through information (pre-)configured independently of resource pool configuration information. Also, in sidelink unicast transmission, (pre-)configuration may be configured through PC5-RRC. Alternatively, a method in which (pre-)configuration is configured through MAC-CE may also be considered. It is noted that in the disclosure, the performance of (pre-)configuration may be applied to all of the above-described cases.

With reference to 303 in FIG. 3, a case in which a resource pool is continuously allocated on the frequency axis is illustrated. Resource allocation in the frequency axis may be configured in SL BWP information, and may be performed in sub-channels. A sub-channel may be defined as a resource allocation unit on the frequency axis including one or more PRBs. That is, a sub-channel may be defined as an integer multiple of PRB. With reference to 303 in FIG. 3, a sub-channel may be constituted with 5 consecutive PRBs, and the size (sizeSubchannel) of a sub-channel may be the size of 5 consecutive PRBs. However, the illustration of the drawing is only an example, and the size of a sub-channel may be configured differently and one sub-channel is constituted with consecutive PRBs in general, but a sub-channel is not necessarily constituted with consecutive PRBs. A sub-channel may be a basic unit of resource allocation for a PSSCH. In 303, startRB-Subchannel may indicate the starting position of a sub-channel on the frequency axis in a resource pool. When resource allocation on the frequency axis is performed in units of sub-channels, resources on the frequency axis may be allocated according to the indices of resource blocks (RBs) (startRB-subchannel) at which sub-channels start, information about the number of PRBs in one sub-channel (sizeSubchannel), and configuration information about the total number of sub-channels (numSubchannel). In this case, information about startRB-Subchannel, sizeSubchannel, and numSubchannel may be (pre-)configured as frequency-axis resource pool information.

As one of the methods for allocating transmission resources in an SL, there is a method for allocating SL transmission resources to a terminal from a base station when the terminal is within the coverage of the base station. Hereinafter, this method is referred to as Mode 1. In other words, Mode 1 may be a method, performed by a base station, for allocating resources used for SL transmission to RRC-connected terminals in a dedicated scheduling scheme. Mode 1 enables a base station to manage resources of an SL, so that it is effective in interference management and resource pool management. On the other hand, methods for allocating transmission resources in an SL include allocating transmission resources through direct sensing by a terminal in an SL. Hereinafter, this method will be referred to as Mode 2. In the case of Mode 2, it may be referred to as UE autonomous resource selection. Unlike Mode 1 in which a base station directly participates in resource allocation, in Mode 2, a transmission terminal autonomously selects resources through a sensing and resource selection procedure defined based on a (pre-)configured resource pool, and transmits data through the selected resources. Next, when transmission resources are allocated through Mode1 or Mode2, the terminal may transmit/receive data and control information through an SL. The control information may include $1^{st}$ stage sidelink control information (SCI) transmitted through a physical sidelink control channel (PSCCH). The $1^{st}$ stage SCI may be referred to as SCI format 1-X. In addition, the control information may include $2^{nd}$ stage SCI transmitted through a physical sidelink shared channel (PSSCH). The $2^{nd}$ stage SCI may be referred to as SCI format 2-X. In SCI format 1-X and SCI format 2-X, X may be expressed as one or more different values to distinguish different formats.

Next, a method is described of using a PRS transmitted through a DL and a UL of a terminal and a base station, for positioning to measure a location of the terminal. In the disclosure, the method of using a positioning signal transmitted through a DL and a UL of a terminal and a base station is referred to as radio access technology (RAT)-dependent positioning. In addition, other positioning methods may be classified as RAT-independent positioning. In particular, in the case of an LTE system, as a RAT-dependent positioning scheme, methods such as observed time difference of arrival (OTDOA), uplink time difference of arrival (UTDOA), and enhanced cell identification (E-CID) may be used. In an NR system, methods such as downlink time difference of arrival (DL-TDOA), downlink angle-of-departure (DL-AOD), multi-round trip time (multi-RTT), NR E-CID, uplink time difference of arrival (UL-TDOA), and uplink angle-of-arrival (UL-AOA) may be used. On the other hand, RAT-independent positioning schemes may include assisted global navigation satellite systems (A-GNSS), a sensor, a wireless local area network (WLAN), and Bluetooth.

The disclosure specifically focuses on RAT-dependent positioning methods supported through an SL. In the case of an interface between a base station and terminals (UL and DL, hereinafter referred to as Uu), the RAT-dependent positioning is available only when a terminal is within the coverage area of a base station. However, it is noted that the RAT-dependent positioning of SL may not be limited to the case in which a terminal is within the coverage of a base station. For RAT-dependent positioning in Uu, positioning protocols such as LTE Positioning Protocol (LPP), LTE positioning protocol annex (LPPa), and NR positioning protocol annex (NRPPa) may be used. First of all, LPP may be a positioning protocol defined between a terminal and a location server (LS), and LPPa and NRPPa may be protocols defined between a base station and an LS. An LS is an entity that manages location measurement, and may perform a location management function (LMF). In addition, the LS may be referred to as an LMF or other names. In both LTE and NR systems, LPP is supported, and roles for positioning including positioning capability exchange, assistance data transmission, location information transmission, error handling, and abort may be performed through LPP. A terminal and an LS perform the above roles through LPP, and it is noted that a base station may perform a role of enabling the terminal and the LS to exchange positioning information. In this case, the exchange of positioning information through LPP may be performed in a base station-transparent manner. This may indicate that the base station is not involved in the exchange of positioning information between the terminal and the LS. In the positioning capability exchange, the terminal may exchange supportable positioning information with the LS. For example, it may be whether the positioning method supported by the terminal is UE-assisted or UE-based, or whether both are possible. Here, UE-assisted positioning is a scheme in which the terminal transmits only a measured value for a positioning scheme to the LS based on a received positioning signal without directly measuring the absolute position of the terminal, and the absolute position of the terminal is calculated by the LS. The absolute position may refer to two-dimensional (x,y) and three-dimensional (x,y,z) coordinate position information of the terminal based on longitude and latitude. On the other hand, UE-based positioning may be a scheme in which the terminal may directly measure the absolute position of the terminal, and for this, the terminal needs to receive a positioning signal, together with position information of the source of the positioning signal.

While an LTE system supports only the UE-assisted scheme, the NR system may support both UE-assisted and UE-based positioning. The assistance data transmission may be a significantly important factor in positioning, to accurately measure the location of the terminal. In particularly, in the case of assistance data transmission, the LS may provide the terminal with configuration information about the positioning signal, information about candidate cells and transmission reception points (TRPS) to receive the positioning signal, and the like. In particularly, when DL-TDOA is used, the information about the candidate cells and TRPs to receive the positioning signal may be information about reference cells, reference TRPs, neighbor cells, and neighbor TRPs. In addition, a plurality of candidates for neighbor cells and neighbor TRPs may be provided, together with information about a preferred cell and TRP to be selected by the terminal to measure the positioning signal. In order for the terminal to accurately measure the location, it is necessary to properly select information about candidate cells and TRPs to be used as a reference. For example, when a channel for a positioning signal received from a corresponding candidate cell and TRP is a line-of-sight (LOS) channel, i.e., a channel having fewer non-LOS (NLOS) channel components, the accuracy of positioning measurement may increase. Therefore, when the LS provides the terminal with information about candidate cells and TRPs, which are the reference for performing positioning by collecting various pieces of information, the terminal may perform more accurate positioning measurement.

The location information transmission may be performed through LPP. The LS may request location information from the terminal, and the terminal may provide measured location information to the LS in response to the corresponding request. In a case of UE-assisted positioning, the location information may be a measured value with respect to a positioning scheme based on a received positioning signal. On the other hand, in UE-based positioning, the corresponding location information may be two-dimensional (x,y) and three-dimensional (x,y,z) coordinate position values of the terminal. When the LS requests the location information from the terminal, the LS may include required accuracy, response time, and the like, in positioning quality-of-service (QoS) information. Upon the request including the positioning QoS information, the terminal needs to provide the LS with the measured location information to satisfy the corresponding accuracy and response time, and, when it is impossible to satisfy the QoS, the terminal may consider error handling and abort. However, this is only an example, and error handling and abort may be performed on positioning in other cases than those in which it is impossible to satisfy QoS.

A positioning protocol defined between the base station and the LS is referred to as LPP in an LTE system, and functions including E-CID location information transmission, OTDOA information transmission, general error state reporting, and assistance information transmission may be performed between the base station and the LS.

A positioning protocol defined between the base station and the LS is referred to as NRPPa in a NR system, and includes the roles performed by LPPa, and functions including positioning information transmission, measurement information transmission, and TRP information transmission may be additionally performed between the base station and the LS. Unlike in an LTE system, in a NR system, more positioning techniques are supported. Accordingly, various positioning schemes may be supported through the positioning information transmission. For example, positioning measurement may be performed by a base station through a positioning sounding reference signal (SRS) transmitted by a terminal. Therefore, information related to positioning SRS configuration and activation/deactivation may be exchanged between the base station and the LS using the positioning information The measurement information transmission is a function of exchanging, between the base station and the LS, information related to multi-RTT, UL-TDOA, and UL-AOA, which are not supported in LTE system. Lastly, the TRP information transmission is a role of exchanging information related to performing of TRP-based positioning, because TRP-based positioning may be performed in the NR system whereas cell-based positioning is performed in the LTE system.

Entities performing positioning-related configuration and entities calculating positioning for measuring a location of a terminal in an SL may be classified into UE (no LS), LS (through BS), and LS (through UE).

LS denotes a location server, BS denotes a base station such as a gNB or eNB, and UE denotes a terminal performing transmission and reception through an SL. As described above, the terminal performing transmission and reception through an SL may be a vehicle terminal or a pedestrian terminal. In addition, the terminal performing transmission and reception through an SL may include an RSU having terminal functions, an RSU having base station functions, or an RSU having some of base station functions and some of terminal functions. In addition, the terminal performing transmission and reception through an SL may include a positioning reference unit (PRU), the location of which is known. The UE (no LS) denotes an SL terminal not connected to the LS. LS (through BS) denotes an LS connected to a base station. On the contrary, LS (through UE) denotes an LS connected to the SL terminal. In other words, LS (through UE) represents a case in which an LS is available even when the UE is not within the coverage of the base station.

Here, LS (through UE) may be available only to certain terminals, such as an RSU or a PRU, other than general terminals. In addition, a terminal connected to the LS through an SL may be defined as a new type of device. In addition, only a particular terminal supporting terminal capability connected to the LS may perform a function of connecting to the LS through an SL.

In Table 1 below, Cases 1 to 9 indicate various combinations of an entity that performs positioning-related configuration and an entity that calculates positioning for measuring a location of a terminal on an SL. In the disclosure, a terminal on which location measurement is required to be performed is referred to as a target terminal. In addition, a terminal, the location of which is known and which is able to provide a positioning signal for measuring the location of the target terminal, is referred to as a positioning reference (PosRef) terminal. Therefore, the PosRef terminal may have its own location information and may provide the location information of the terminal together with an S-PRS. In other words, the PosRef terminal may be a terminal, the location thereof is already known. It is noted that the terms target terminal and PosRef terminal may be replaced with other terms. For example, the PosRef terminal may also be referred to as an anchor terminal. In addition, positioning configuration may be classified into ULE-configured and network-configured schemes.

In Table 1 below, when positioning configuration is UE (no LS), a UE-configured scheme may be applied. The UE-configured scheme is advantageous in that positioning configuration may be performed even when the terminal is not within the network (base station) coverage. When positioning configuration is LS (through BS), it may correspond to a network-configured scheme. In a case of the network-configured scheme, a terminal is in the network coverage. Since positioning calculation and measurement information is reported to a base station and then measurement of the location of a target UE is performed by an LS connected to the base station, delay may occur due to signaling related to the location measurement, but more accurate location measurement may be possible. Further in Table 1, a case in which positioning configuration is LS (through ULE) may not correspond to the network-configured scheme, because the terminal does not operate within the network coverage through the base station. In addition, although the LS connected to the terminal provides configurations, when it is not classified as being configured by the terminal, it may not be classified as UE-configured scheme. However, when it is classified as being configured by the terminal, it may be classified as UE-configured scheme. Accordingly, in a case of LS (through UE), it may be referred to as a scheme other than the UE-configured or network-configured scheme.

In addition, positioning calculation may be classified into two schemes, i.e., UE-assisted and UE-based schemes, as described above. In Table 1, a case in which positioning calculation is UE (no LS) may correspond to the UE-based scheme, and a case in which positioning calculation is LS (through BS) or LS (through UE) may generally correspond to the UE-assisted scheme. However, when positioning calculation is LS (through UE) and a corresponding LS is interpreted to a terminal, the LS (through UE) may be also classified as the UE-based scheme.

TABLE 1

| | Positioning configuration | Positioning calculation |
|---|---|---|
| Case 1 | UE (no LS) | UE (no LS) |
| Case 2 | UE (no LS) | LS (through BS) |
| Case 3 | UE (no LS) | LS (through UE) |
| Case 4 | LS (through BS) | UE (no LS) |
| Case 5 | LS (through BS) | LS (through BS) |
| Case 6 | LS (through BS) | LS (through UE) |
| Case 7 | LS (through UE) | UE (no LS) |
| Case 8 | LS (through UE) | LS (through BS) |
| Case 9 | LS (through UE) | LS (through UE) |

In Table 1, positioning configuration information may include S-PRS configuration information. The S-PRS configuration information may be pattern information of an S-PRS and information related to a time/frequency transmission location. In addition, in Table 1, the positioning calculation may be performed by the terminal receiving an S-PRS and performing measurement from the received S-PRS, and the positioning measurement and calculation method may vary depending on which positioning method is applied. Measurement of location information in an SL may be absolute positioning to provide two-dimensional (x,y) and three-dimensional (x,y,z) coordinate position values of a terminal, or relative positioning to provide relative two-dimensional or three-dimensional position information from another terminal. In addition, the location information in the SL may be ranging information including one of the distance or direction from another terminal. When the meaning of ranging in the SL includes both distance and direction information, the ranging may have the same meaning as that of relative positioning. Also, as a positioning method, sidelink time difference of arrival (SL-TDOA), sidelink angle-of-departure (SL-AOD), sidelink multi-round trip time (SL Multi-RTT), sidelink round time (SL RTT), SL E-CID, sidelink angle-of-arrival (SL-AOA), or the like may be considered.

Figure 4:
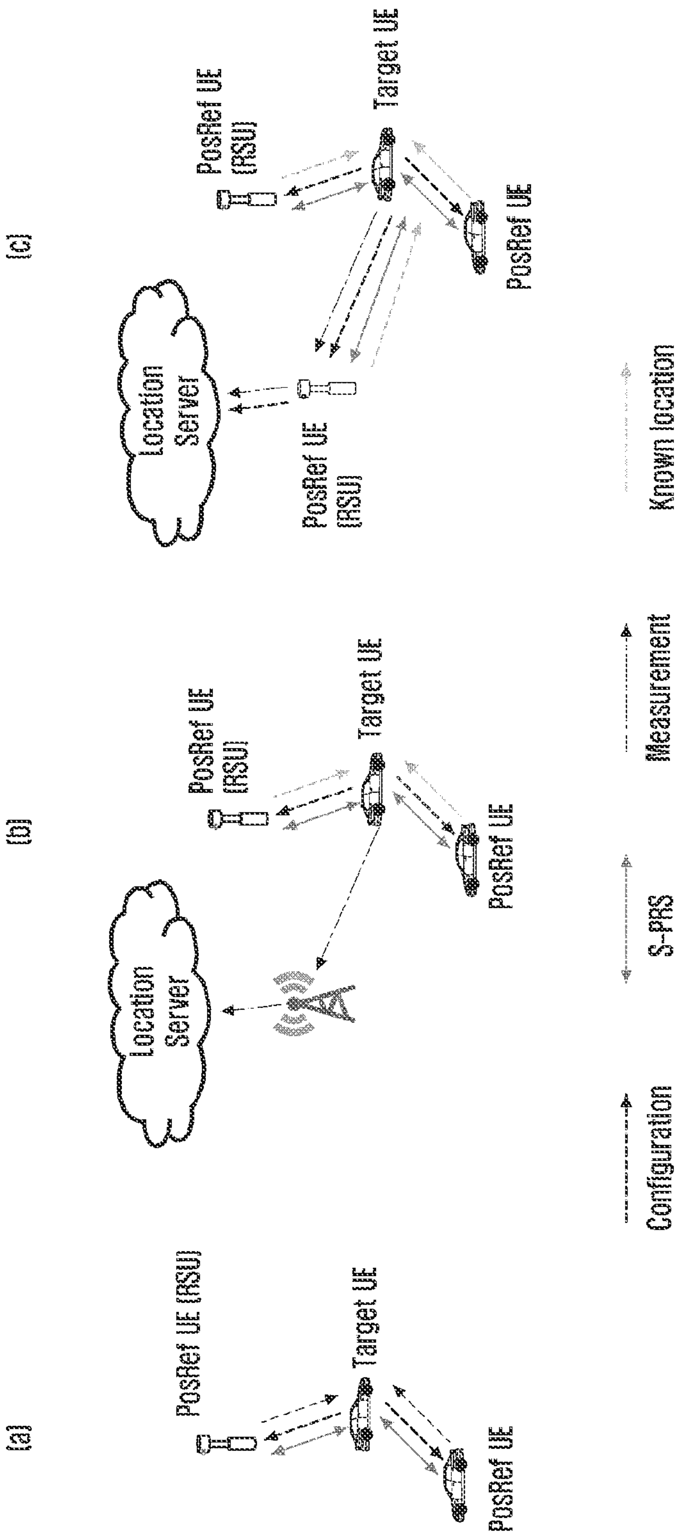
FIG. 4 illustrates a method of calculating a location of a terminal through an SL according to an embodiment.
Figure 5:
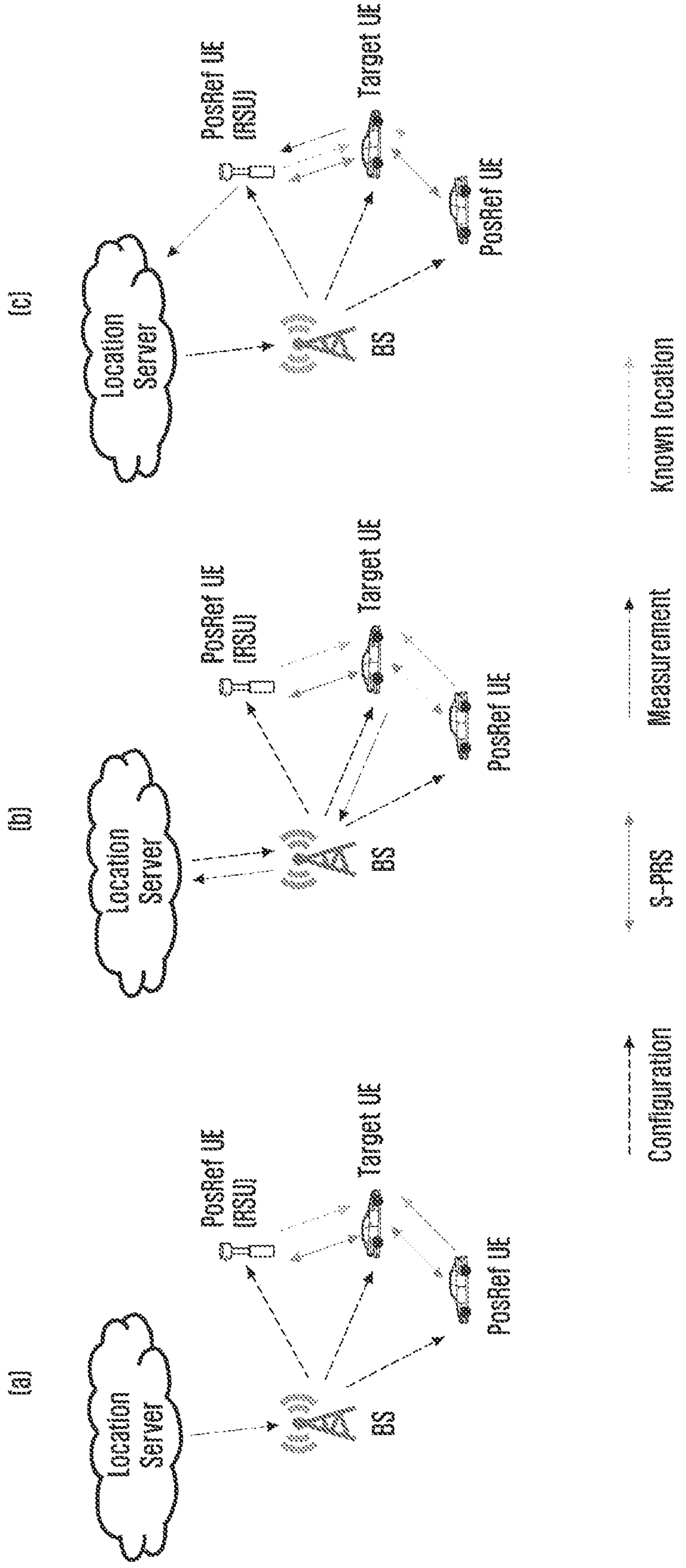
FIG. 5 illustrates a method of calculating a location of a terminal through an SL according to an embodiment.
Figure 6:
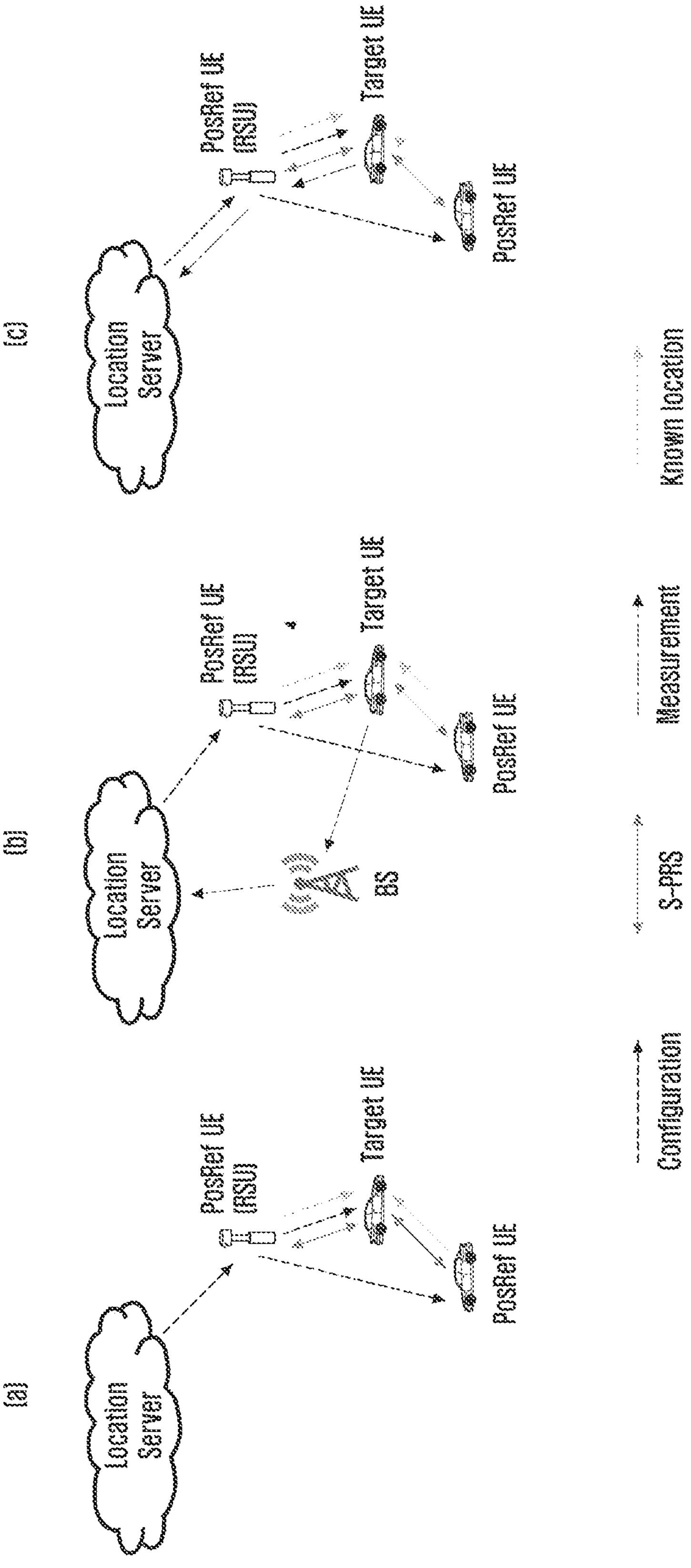
FIG. 6 illustrates a method of calculating a location of a terminal through an SL according to an embodiment.

FIG. 4 illustrates a method of calculating a location of a terminal through an SL according to an embodiment. However, in the disclosure, the case of calculating the location of the terminal through the SL is not limited to the cases illustrated in FIGS. 4 to 6. Signaling of positioning configuration information in FIGS. 4 to 6 is illustrated as a black dotted line. The transmission of S-PRS is illustrated as a light blue dotted line. It is noted that in the case of S-PRS transmission, it can be done in both directions or in one direction. Transmission of measured information or measured positioning information for positioning is illustrated as a red dotted line. Finally, transmission of location information known by the terminal (known location) is illustrated as a blue dotted line.

Part (a) in FIG. 4 illustrates an example in which an SL terminal not connected to an LS provides positioning configuration and a target terminal not connected to the LS performs positioning calculation. This may correspond to Case 1 in Table 1. In this case, positioning-related configuration information may be indicated in broadcast, unicast, or group-cast from a target terminal to another terminal through an SL. In addition, the target terminal may perform positioning calculation based on the provided positioning signal.

Part (b) in FIG. 4 illustrates an example in which an SL terminal not connected to an LS provides positioning configuration, a target terminal is located within a network coverage, and thus the LS connected to a base station performs positioning calculation. This may correspond to Case 2 in Table 1. In this case, positioning-related configuration information may be indicated in broadcast, unicast, or group-cast from a target terminal to another terminal through an SL. In addition, the target terminal performs positioning measurement based on the provided positioning signal, and reports measured positioning information to the base station because the target terminal is within the coverage of the base station. Then, corresponding measurement information may be reported to the LS connected to the base station, and thus the LS may perform positioning calculation.

Part (c) in FIG. 4 illustrates an example in which an SL terminal not connected to an LS provides positioning configuration and the LS performs positioning calculation through an SL terminal connected to the LS. This may correspond to Case 3 in Table 1. In this case, positioning-related configuration information may be indicated in broadcast, unicast, or group-cast from a target terminal to another terminal through an SL. In addition, the target terminal performs positioning measurement based on the provided positioning signal, and reports measured positioning information to a terminal connected to the LS because the target terminal is within SL coverage with the terminal connected to the LS. In part (c) of FIG. 4, the terminal connected to the LS is a PosRef UE (RSU) is illustrated, but it is noted that the terminal may be a terminal other than the RSU. Then, corresponding measurement information may be reported to the LS connected to the PosRef UE (RSU), and thus the LS may perform positioning calculation.

FIG. 5 illustrates a method of calculating a location of a terminal through an SL according to an embodiment. Part (a) in FIG. 5 illustrates an example in which an SL terminal is located within a network coverage, an LS connected to a base station provides positioning configuration, and a target terminal not connected to the LS performs positioning calculation. This may correspond to Case 4 in Table 1. In this case, positioning configuration information may be provided by the LS connected to a base station using a positioning protocol such as LPP. In addition, the target terminal may perform positioning calculation based on the provided configuration information and positioning signal.

Part (b) in FIG. 5 illustrates an example in which an SL terminal is located within a network coverage, an LS connected to a base station provides positioning configuration, a target terminal is located within the network coverage, and the LS connected to the base station performs positioning calculation. This may correspond to Case 5 in Table 1. In this case, positioning configuration information may be provided by the LS connected to a base station using a positioning protocol such as LPP. In addition, the target terminal performs positioning measurement based on the provided configuration information and positioning signal, and reports measured positioning information to the base station because the target terminal is within the coverage of the base station. Then, corresponding measurement information may be reported to the LS connected to the base station, and thus the LS may perform positioning calculation.

Part (c) in FIG. 5 illustrates an example in which an SL terminal is located within a network coverage, an LS connected to a base station provides positioning configuration, and the LS performs positioning calculation through an SL terminal connected to the LS. This may correspond to Case 6 in Table 1. In this case, positioning configuration information may be provided by the LS connected to a base station using a positioning protocol such as LPP. In addition, the target terminal performs positioning measurement based on the provided configuration information and positioning signal, and reports measured positioning information to a terminal connected to the LS because the target terminal is within SL coverage with the terminal connected to the LS. In part (c) of FIG. 5, the terminal connected to the LS is illustrated as a PosRef UE(RSU), but it is noted that the terminal may be a terminal other than the RSU. Then, corresponding measurement information may be reported to the LS connected to the PosRef UE(RSU), and thus the LS may perform positioning calculation.

FIG. 6 illustrates a method of calculating a location of a terminal through an SL according to an embodiment. Part (a) in FIG. 6 illustrates an example in which an LS provides positioning configuration through an SL terminal connected to the LS, and a target terminal not connected to the LS performs positioning calculation. This may correspond to Case 7 in Table 1. In this case, the LS connected to the terminal may provide positioning configuration information by using a positioning protocol such as LPP. In addition, the target terminal may perform positioning calculation based on the provided configuration information and positioning signal.

Part (b) in FIG. 6 illustrates an example in which an LS provides positioning configuration through an SL terminal connected to the LS, a target terminal is located within a network coverage, and the LS connected to a base station performs positioning calculation. This may correspond to Case 8 in Table 1. In this case, the LS connected to the terminal may provide positioning configuration information by using a positioning protocol such as LPP. In addition, the target terminal may perform positioning calculation based on the provided configuration information and positioning signal, and reports measured positioning information to the base station because the target terminal is within the coverage of the base station. Then, corresponding measurement information may be reported to the LS connected to the base station, and thus the LS may perform positioning calculation.

Part (c) in FIG. 6 illustrates an example in which an LS provides positioning configuration through an SL terminal connected to the LS, and the LS performs positioning calculation through the SL terminal connected to the LS. This may correspond to Case 9 in Table 1. In this case, the LS connected to the terminal may provide positioning configuration information by using a positioning protocol such as LPP. In addition, the target terminal performs positioning measurement based on the provided configuration information and positioning signal, and reports measured positioning information to a terminal connected to the LS because the target terminal is within SL coverage with the terminal connected to the LS. In part (c) of FIG. 6, the terminal connected to the LS is illustrated as a PosRef UE(RSU), it is noted that the terminal may be a terminal other than the RSU. Then, corresponding measurement information may be reported to the LS connected to the PosRef UE(RSU), and thus the LS may perform positioning calculation.

Figure 7:
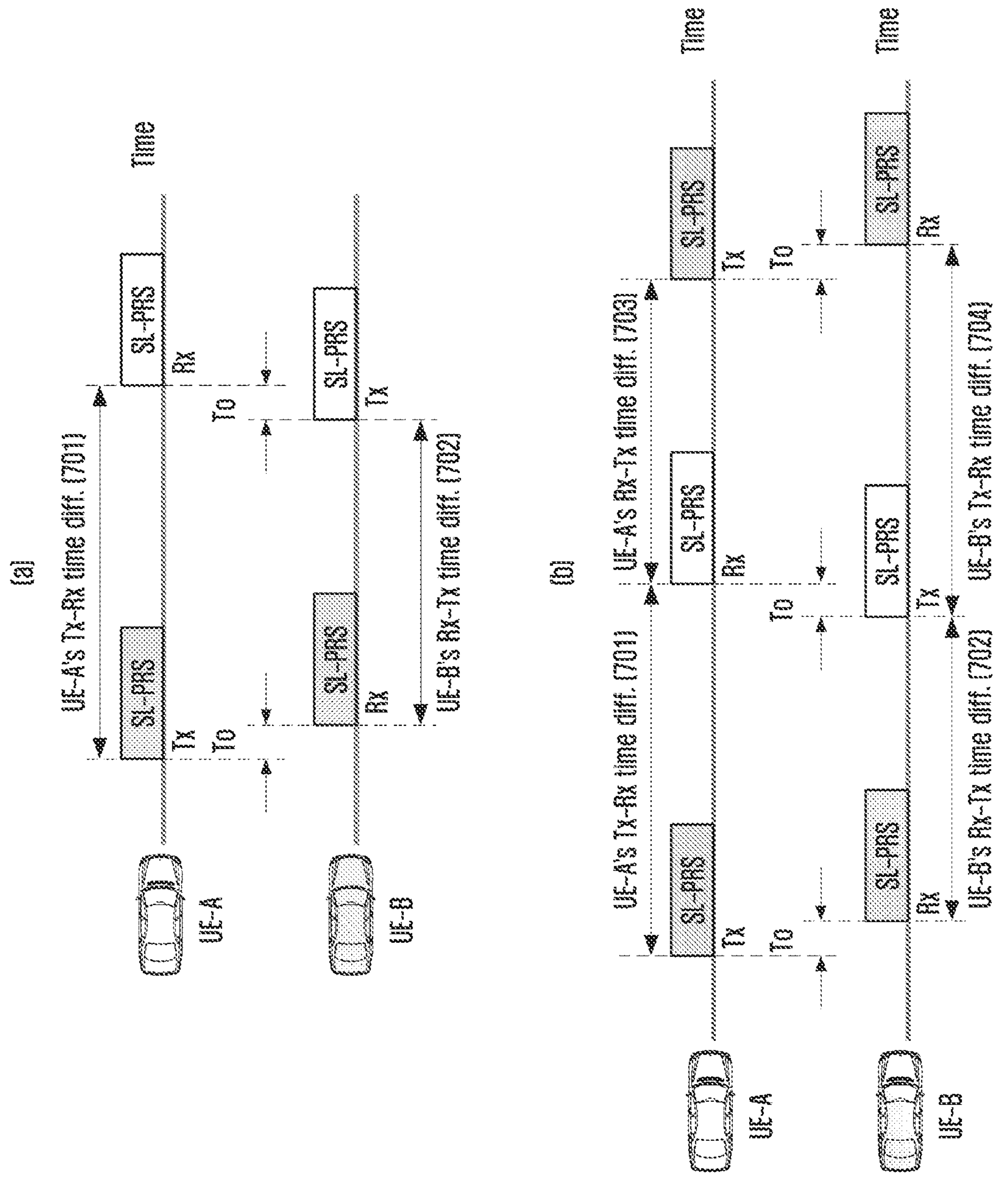
FIG. 7 illustrates a method of performing positioning using an RTT scheme according to an embodiment.

FIG. 7 illustrates a method of performing positioning using an RTT scheme according to an embodiment. In FIG. 7, UE-A and UE-B may correspond to a target terminal and a PosRef terminal, respectively. However, in FIG. 7, UE-A and UE-B are not limited to Target UE and PosRef UE, respectively. In other words, UE-A may correspond to a PosRef terminal and UE-B may correspond to a target terminal. FIG. 7 illustrates a method (Single RTT) in which a target terminal performs RTT as one pair with one PosRef terminal. However, the target terminal may perform RTT with a plurality of PosRef terminals. In this case, unlike in FIG. 7, a plurality of pairs may exist between a target terminal and one PosRef terminal, and this method may be named Multi-RTT. Multi-RTT may be required for the target device to perform absolute positioning. The terminal may calculate time of flight (ToF) using the RTT scheme and measure a distance using the relational expression of 'velocity=time/distance' or distance=speed x time' or 'time=distance/velocity'. TToF means time, and the speed of light may be applied to the speed.

Part (a) of FIG. 7 illustrates a single sided RTT scheme. According to the single sided RTT, RTT measurement may be performed as UE-A transmits a positioning signal to UE-B and UE-B transmits a positioning signal to UE-A, as illustrated in part (a) of FIG. 7. In particular, UE-A may calculate $T_{round}$ 701, which is a difference between the time at which the positioning signal is transmitted to UE-B and the time at which the positioning signal is received from UE-B. UE-B may calculate $T_{reply}$ 702, which is a difference between the time at which the positioning signal is received from UE-B and the time at which the positioning signal is transmitted to UE-B. From this, the terminal will be able to calculate time of flight (ToF) as shown in Equation (1) below.

$$ToF = 1/2(T_{round} - T_{reply}) \quad (1)$$

To calculate Equation (1) by UE-A, $T_{reply}$ information calculated by UE-B needs to be indicated to UE-A. To calculate Equation (1) by UE-B, $T_{round}$ information calculated by UE-A needs to be indicated to UE-B. For details on indicating the corresponding information, a fourth embodiment below is referred.

Part (b) of FIG. 7 illustrates a double sided RTT scheme. According to the double sided RTT, as illustrated in part (b) of FIG. 7, RTT measurement may be performed as UE-A transmits a positioning signal to UE-B, UE-B transmits a positioning signal to UE-A, and UE-A transmits a positioning signal to UE-B again. In particular, UE-A may calculate $T_{round1}$ 701, which is a difference between the time at which the positioning signal is transmitted to UE-B and the time at which the positioning signal is received from UE-B. UE-B may calculate $T_{reply1}$ 702, which is a difference between the time at which the positioning signal is received from UE-B and the time at which the positioning signal is transmitted to UE-B. Next, from this, UE-A may calculate $T_{reply2}$ 703, which is a difference between the time at which the positioning signal is received from UE-B and the time at which a second positioning signal is transmitted to UE-B. UE-B may calculate $T_{round2}$ 704, which is a difference between the time at which the positioning signal is transmitted to UE-A and the time at which the second positioning signal is received from UE-B. From this, the terminal will be able to calculate time of flight (ToF) as shown in Equation (2) below.

$$ToF = (T_{round1} \times T_{round2} - T_{reply1} \times T_{reply2})/(T_{round1} + T_{round2} + T_{reply1} + T_{reply2}) \quad (2)$$

To calculate Equation (2) by UE-A, the $T_{reply1}$ and $T_{round2}$ information calculated by UE-B needs to be indicated to UE-A. To calculate Equation 2 by UE-B, $T_{round1}$ and $T_{reply2}$ information calculated by UE-A need to be indicated to UE-B. For details on indicating the corresponding information, a fifth embodiment below is referred. Compared to the single sided RTT according to Equation 1, in the case of double sided RTT according to Equation (2), the effect of clock drift in each terminal is minimized, thereby improving positioning accuracy. However, additional signal exchange may occur, resulting in additional delay in calculating ToF. In the disclosure, the method for using the RTT by the UE is not limited to the above two methods. In other words, the terminal may calculate ToF by additionally calculating $T_{reply}$ and $T_{round}$ through additional positioning signal exchange after $T_{reply2}$ and $T_{round2}$.

It is noted that one or more of the following embodiments may be used in combination with each other in the disclosure. The disclosure proposes a method for generating a pseudorandom-based sequence and a Zadoff-Chu-based S-PRS sequence in consideration of an SL environment. In addition, the disclosure proposes an S-PRS pattern according to this. In particular, the disclosure proposes in which symbol of the SL slot the S-PRS may be transmitted, in which RE on a frequency axis the S-PRS may be transmitted, and how the S-PRS may be multiplexed with other channels and signals. In addition, the disclosure proposes the parameters required for transmission of S-PRS and a method for configuring the parameters. In addition, the disclosure proposes a terminal operation according to the above.

First Embodiment

The first embodiment discloses a method for generating a pseudorandom-based S-PRS sequence in consideration of an SL environment. In particular, the first embodiment discloses a method for determining parameters required to generate a pseudorandom-based S-PRS sequence in consideration of an SL environment. In an SL, a case in which a terminal is within the coverage of a base station and a case in which the terminal is outside the coverage of the base station may occur. Therefore, a method for determining a specific parameter needs to be determined regardless of whether the terminal is within coverage or outside coverage. For example, a method in which a base station determines and indicates a specific parameter can be used only when the terminal is within coverage, and thus cannot be used when the terminal is outside the coverage of the base station.

A pseudorandom sequence is defined from a Gold sequence of length 31, and a pseudorandom sequence c(n) of length $M_{PN}$ may be defined as in Equation (3) below.

$$c(n) = (x_1(n+N_c) + x_2(n+N_c))\bmod 2 \quad (3)$$

$$x_1(n+31) = (x_1(n+3) + x_1(n))\bmod 2$$

$$x_2(n+31) = (x_2(n+3) + x_2(n+2) + x_2(n+1))\bmod 2$$

In Equation (3), $N_c$=1600 and the first m-sequence $x_1(n)$ will be initialized to $x_1(0)=1$, $x_1(n)=0$, n=1, 2, . . . , 30. The initialization of the second m-sequence, $x_2(n)$, may be expressed as $$c_{init} = \sum_{i=0}^{30} x_2(i)\cdot 2^i,$$

and a corresponding value may be determined by the application of the sequence. The initialization may be performed.

In particular, the pseudorandom-based S-PRS sequence may be defined in Equation (4) below.

$$r(m) = \frac{1}{\sqrt{2}}(1-2c(2m)) + j\frac{1}{\sqrt{2}}(1-2c(2m+1)) \quad (4)$$

In Equation (4), c(i) is presented in Equation 3, and the pseudorandom sequence may be initialized according to Equations (5), (6) and (7) below. In the disclosure, the initialization method may not be limited to Equations (5), (6) and (57). In Equations (5), (6) and (7) below, it is assumed that 4096 S-PRS sequence IDs ($N_{ID} \in \{0, 1, \ldots, 4095\}$) are used. However, in the disclosure, the number of S-PRS sequence IDs may not be limited to a specific value.

$$c_{init} = \left(2^{22}\left\lfloor\frac{N_{ID}}{1024}\right\rfloor + 2^{10}\left(N_{symb}^{slot}n_{s,f}^{\mu} + l + 1\right)(2(N_{ID} \bmod 1024) + 1) + (N_{ID} \bmod 1024)\right) \bmod 2^{31} \quad (5)$$

$$c_{init} = \left(2^{12}\left(N_{symb}^{slot}n_{s,f}^{\mu} + l + 1\right)(2N_{ID} + 1) + N_{ID}\right)\bmod 2^{31} \quad (6)$$

$$c_{init} = \left(2^{17}\left(N_{symb}^{slot}n_{s,f}^{\mu} + l + 1\right)(2N_{ID} + 1) + 2N_{ID}\right) \bmod 2^{31} \quad (7)$$

In Equations (5), (6) and (7), $$N_{symb}^{slot}$$

is 14 for a normal cyclic prefix and 12 for an extended cyclic prefix.

$$n_{s,f}^{\mu}$$

represents a slot number within a frame, and l represents an OFDM symbol number. The disclosure proposes methods for determining $N_{ID}$ (S-PRS sequence ID) in the above equation. The method for determining $N_{ID}$ in the disclosure may not be limited to the following methods. Also, one or more of the methods below may be used in combination. Also, one or more of the methods below are supported and (pre-)configuration may be performed on which method is used.

A Method for Determining Nm (S-PRS Sequence ID)

In determining $N_{ID}$, in method 1 $N_{ID}$, is determined by the [12] bits LSB of CRC of the corresponding 1st SCI. In method 2, $N_{ID}$, is determined by the [12] bits LSB of destination ID carried in the 1st or 2nd SCI. In method 3, $N_{ID}$, is determined by the [8] bits of the source ID carried in the 1st or 2nd SCI+[4] zero bits. In method 4, $N_{ID}$, is determined by (pre-)configured value. In method 5, $N_{ID}$, is determined into fixed value (i.e., zero), and in method 6, $N_{ID}$, is determined by the [12] bits in the 1st or 2nd SCI.

In method 1, it is assumed that a PSCCH, that is, the 1st SCI is transmitted in a slot in which the S-PRS is transmitted. However, if the PSCCH is not transmitted in every slot in which the S-PRS is transmitted, it may be considered to operate based on the most recently transmitted PSCCH, that is, the 1st SCI. According to method 1, it may be determined as $$N_{ID} = N_{ID}^{X} \bmod 2^{12}.$$

Here, $$N_{ID}^{X} = \sum_{i=0}^{L-1} p_i \cdot 2^{L-1-i}$$

and L=24 and the value p represents the parity bits $p_0$, $p_1$, $p_2$, $p_3$, . . . , $p_{L-1}$ used for CRC calculation of PSCCH, and may be generated by cyclic generator polynomials. In Method 1, it is assumed that 4096 S-PRS sequence IDs are used and information of [12] bits is used, but in the disclosure, the number of S-PRS sequence IDs is not limited to a specific value. When $2^Y$ S-PRS sequence IDs are used, it is determined as $$N_{ID} = N_{ID}^{X} \bmod 2^{Y}.$$

In method 2, it is assumed that the PSCCH, that is, the 1st SCI and the 2nd SCI are transmitted in a slot in which the S-PRS is transmitted. Also, it is assumed that a destination ID is included in the 1st SCI or 2nd SCI. The destination ID is assumed to be 16 bits. However, in the disclosure, the destination ID is not limited to 16 bits. If the 1st SCI or 2nd SCI is not transmitted in every slot in which the S-PRS is transmitted, it may be considered to perform an operation based on the destination ID included in the most recently transmitted 1st SCI or 2nd SCI. In Method 2, it is assumed that 4096 S-PRS sequence IDs are used and information of [12] bits is used, but in the disclosure, the number of S-PRS sequence IDs is not limited to a specific value. When $2^{Y}$ S-PRS sequence IDs are used, [12] bits may be replaced with Y bits assuming Y≤16.

In method 3, it is assumed that the PSCCH, that is, the 1st SCI and the 2nd SCI are transmitted in a slot in which the S-PRS is transmitted. Also, it is assumed that a source ID is included in the 1st SCI or 2nd SCI. The source ID is assumed to be 8 bits. However, in the disclosure, the source ID is not limited to 8 bits. If the 1st SCI or 2nd SCI is not transmitted in every slot in which the S-PRS is transmitted, it may be considered to perform an operation based on the source ID included in the most recently transmitted 1st SCI or 2nd SCI. In method 3, it is assumed that 4096 S-PRS sequence IDs are used and information of 12 bits is required. However, in the disclosure, the number of S-PRS sequence IDs is not limited to a specific value. The number of zero bits required may vary depending on the number of required bits of the source ID and the number of bits of the S-PRS sequence ID.

In methods 4 and 5, $N_{ID}$ (S-PRS sequence ID) is (pre-) configured or fixed to a specific value, and it may be difficult to randomize $N_{ID}$ according to these methods.

In method 6, $N_{ID}$ (S-PRS sequence ID) is separately indicated through the 1st SCI or the 2nd SCI, and the terminal may arbitrarily select and determine a corresponding value. Method 6 assumes 4096 S-PRS sequence IDs are used and information of 12 bits is required. However, in the disclosure, the number of S-PRS sequence IDs is not limited to a specific value.

Second Embodiment

A second embodiment discloses a method for generating a Zadoff-Chu-based S-PRS sequence in consideration of an SL environment. In particular, the second embodiment discloses a method for determining parameters required to generate a Zadoff-Chu-based S-PRS sequence in consideration of an SL environment. In an SL, a case in which a terminal is within the coverage of a base station and a case in which the terminal is outside the coverage of the base station may occur. Therefore, a method for determining a specific parameter needs to be determined regardless of whether the terminal is within coverage or outside coverage. For example, a method in which a base station determines and indicates a specific parameter can be used only when the terminal is within coverage, and thus cannot be used when the terminal is outside the coverage of the base station.

First, the Zadoff-Chu sequence $$r_{u,v}^{(\alpha,\delta)}(n)$$

defined by the length $M_{ZC}$, the cyclic shift α and the base sequence $\bar{r}_{u,v}(n)$ can be defined as in Equations (8) and (9) below.

$$r_{u,v}^{(\alpha,\delta)}(n) = e^{j\alpha n}\bar{r}_{u,v}(n),\ 0 \le n \le M_{ZC} \tag{8}$$

Details regarding Equation (8) may be found in the corresponding standard specification.

In particular, the Zadoff-Chu-based S-PRS sequence may be defined as in Equation (9) below.

$$\begin{aligned} r^{(p_i)}(n, l') &= r_{u,v}^{(\alpha_i,\delta)}(n) \\ 0 \le n &\le M_{sc,b}^{PRS} - 1 \\ l' &\in \{0, 1, \ldots, N_{symb}^{PRS} - 1\} \end{aligned} \tag{9}$$

In Equation (9), $$N_{symb}^{PRS}$$

is a symbol length of S-PRS, and the following may be considered as a method for determining a corresponding symbol length value. In the disclosure, the value of $$N_{symb}^{PRS}$$

may not be limited to a specific value. In addition, the method for determining the symbol length of the S-PRS is not limited to the method presented below. Also, one or more of the methods below may be used in combination. Also, one or more of the methods below may be supported and (pre-)configuration of which method is used may be performed.

A Method for Determining $$N_{symb}^{PRS}$$

(a Symbol Length of S-PRS)

In determining $$N_{symb}^{PRS},$$

method 1 provides a fixed to one specific value, method 2 provides that one or more values are supported and one value is (pre-)configured, and method 3 provides that one or more values are supported and more than one value can be (pre-)configured.

When one or more values are supported or one or more values are (pre-)configured, the terminal may select one value and indicate the selected value to other terminals. In this case, various methods such as 1st SCI, 2nd SCI, SL MAC-CE, PC5-RRC may be used to indicate the corresponding value.

Equation 9 may be calculated as $\delta=\log_2(K_{TC})$, and $K_{TC}$ represents a comb pattern on the frequency axis of S-PRS.

The value of $K_{TC} \in \{2,4,8\}$ may be considered, and the following may be considered as a method for determining $K_{TC}$. In the disclosure, the value of $K_{TC}$ is not limited to 2, 4, or 8. For example, $K_{TC}$=1 could be used. In particular, $K_{TC}$=1 indicates a case in which S-PRS is transmitted to all REs. The method for determining $K_{TC}$ is not limited to the method presented below. Also, one or more of the methods below may be used in combination. Also, one or more of the methods below may be supported and (pre-)configuration of which method is used may be performed.

Method for Determining $K_{TC}$

In determining $K_{TC}$, in method 1, one value is (pre-) configured, in method 2, a range of available $K_{TC}$ values is (pre-)configured, and in method 3, when one or more values are configured, the terminal may select one value and indicate the selected value to another terminal.

Various methods such as 1st SCI, 2nd SCI, SL MAC-CE, PC5-RRC may be used to indicate the corresponding value.

The range of $C_{PRS}$ values that may be used in Method 2 may be determined by the priority of the terminal and a channel busy ratio (CBR).

In Equation (9), the value of cyclic shift $\alpha_i$ for antenna port $p_i$ may be determined in Equation (10) below.

$$\alpha_i = 2\pi \frac{n_{PRS}^{cs,i}}{n_{PRS}^{cs,max}} \text{ where} \tag{10}$$

$$n_{PRS}^{cs,i} = \begin{cases} \left( n_{PRS}^{cs} + \dfrac{n_{PRS}^{cs,max} \lfloor (p_i - X)/2 \rfloor}{N_{ap}^{PRS}/2} \right) \bmod n_{PRS}^{cs,max} & \text{if } N_{ap}^{PRS} = 4 \text{ and } n_{PRS}^{cs,max} = 6 \\ \left( n_{PRS}^{cs} + \dfrac{n_{PRS}^{cs,max}(p_i - X)}{N_{ap}^{PRS}} \right) \bmod n_{PRS}^{cs,max} & \text{otherwise} \end{cases}$$

In Equation (10), X represents the lowest antenna port value for S-PRS, and for example, when the corresponding value is 6000, it may be X=6000.

$$n_{PRS}^{cs}$$

is a cyclic shift value, and it may be determined as $$n_{PRS}^{cs} \in \{0, 1, \ldots, n_{PRS}^{cs,max} - 1\}.$$

Here, $$n_{PRS}^{cs,max}$$

refers to Table 2 below.

TABLE 2

| $K_{TC}$ | $n_{PRS}^{cs,\ max}$ |
|---|---|
| 2 | 8 |
| 4 | 12 |
| 8 | 6 |

A method for determining $$n_{PRS}^{cs}$$

is presented as below. In the disclosure, the method for determining $$n_{PRS}^{cs}$$

may not be limited to the following methods. Also, one or more of the methods below may be used in combination. Also, one or more of the methods below are supported and (pre-)configuration of which method is used may be performed.

Method for Determining $$n_{PRS}^{cs}$$

In determining $$n_{PRS}^{cs},$$

in method 1, $$n_{PRS}^{cs}$$

is determined by the $$\lceil \log_2 n_{PRS}^{cs,max} \rceil$$

bits LSB of CRC of the corresponding 1st SCI, method 2, $$n_{PRS}^{cs}$$

is determined by the $$\lceil \log_2 n_{PRS}^{cs,max} \rceil$$

bits LSB of destination ID carried in the 1st or 2nd SCI, method 3, $$n_{PRS}^{cs}$$

is determined by the $$\lceil \log_2 n_{PRS}^{cs,max} \rceil$$

bits of the source ID carried in the 1st or 2nd SCI, method 4, $n_{PRS}^{cs}$ is determined by a (pre-)configured value, in method 5, $n_{PRS}^{cs}$ is determined into a fixed value (i.e., zero), and in method 6, $n_{PRS}^{cs}$ is determined by the $\lceil \log_2 n_{PRS}^{cs,max} \rceil$ bits in the 1st or 2nd SCI.

In method 1, it is assumed that a PSCCH, that is, the 1st SCI is transmitted in a slot in which the S-PRS is transmitted. However, if the PSCCH is not transmitted in every slot in which the S-PRS is transmitted, it may be considered to perform an operation based on the most recently transmitted PSCCH, that is, the 1st SCI. According to Method 1, it may be determined as $N_{ID}$=

$N_{ID}^{X} \bmod 2^{Y}$.

Here, $Y = \lceil \log_2 n_{PRS}^{cs,max} \rceil,\ N_{ID}^{X} = \sum_{i=0}^{L-1} p_i \cdot 2^{L-1-i},\ L = 24,$ and the value p represents parity bits $p_0, p_1, p_2, p_3, \ldots, p_{L-1}$ used for calculating the CRC of the PSCCH and may be generated by cyclic generator polynomials.

In method 2, it is assumed that a PSCCH, that is, the 1st SCI and the 2nd SCI are transmitted in a slot in which the S-PRS is transmitted. Also, it is assumed that a destination ID is included in the 1st SCI or 2nd SCI. The destination ID is assumed to be 16 bits. However, in the disclosure, the destination ID is not limited to 16 bits. If the 1st SCI or 2nd SCI is not transmitted in every slot in which the S-PRS is transmitted, it may be considered to perform an operation based on the destination ID included in the most recently transmitted 1st SCI or 2nd SCI.

In method 3, it is assumed that a PSCCH, that is, the 1st SCI and the 2nd SCI are transmitted in a slot in which the S-PRS is transmitted. Also, it is assumed that a source ID is included in the 1st SCI or 2nd SCI. The source ID is assumed to be 8 bits. However, in the disclosure, the source ID is not limited to 8 bits. If the 1st SCI or 2nd SCI is not transmitted in every slot in which S-PRS is transmitted, it may be considered to perform an operation based on the source ID included in the most recently transmitted 1st SCI or 2nd SCI.

In methods 4 and 5, $n_{PRS}^{cs}$ is (pre-)configured or fixed to a specific value, and difficulties may arise in randomizing $n_{PRS}^{cs}$.

In method 6, $n_{PRS}^{cs}$ is separately indicated through the 1st SCI or the 2nd SCI, and the terminal may arbitrarily select and determine the corresponding value.

A method for determining a sequence group u and a sequence number v in Equation (9) is presented. The sequence group u may be determined by Equation (11) below.

$$u = \left(f_{gh}\left(n_{s,f}^{\mu}, l'\right) + n_{ID}^{PRS}\right) \bmod 30 \tag{11}$$

In Equation (11), $f_{gh}\left(n_{s,f}^{\mu}, l'\right)$ is an equation that performs group hopping, and details thereof will be discussed again below. In the above equation, $n_{ID}^{PRS}$ is an S-PRS sequence ID, and methods for determining the S-PRS sequence ID are presented below. The method for determining $n_{ID}^{PRS}$ may not be limited to the following methods.

Method for Determining $n_{ID}^{PRS}$ (S-PRS Sequence ID)

In determining $n_{ID}^{PRS}$, in method 1, $$n_{ID}^{PRS}$$

is determined by the [16] bits LSB of CRC of the corresponding 1st SCI.

In method 2, $$n_{ID}^{PRS}$$

is determined by the [16] bits destination ID carried in the 1st or 2nd SC. In method 3, $$n_{ID}^{PRS}$$

is determined by the [8] bits of the source ID carried in the 1st or 2nd SCI+[8] zero bits. In method 4, $$n_{ID}^{PRS}$$

is determined by a (pre-)configured value. In method 5, $$n_{ID}^{PRS}$$

is determined into a fixed value (i.e., zero), and in method 6, $$n_{ID}^{PRS}$$

is determined by the [16] bits in the 1st or 2nd SCI.

In method 1, it is assumed that a PSCCH, that is, the 1st SCI is transmitted in a slot in which the S-PRS is transmitted. However, if the PSCCH is not transmitted in every slot in which the S-PRS is transmitted, it may be considered to perform an operation based on the most recently transmitted PSCCH, that is, the 1st SCI. in method 1, it may be determined as $$N_{ID} = N_{ID}^{X} \bmod 2^{16}.$$

Here, $$N_{ID}^{X} = \sum_{i=0}^{L-1} p_i \cdot 2^{L-1-i},\ L = 24$$

and the value p represents parity bits $p_0, p_1, p_2, p_3, \ldots, p_{L-1}$ used for CRC calculation of PSCCH, and may be generated by cyclic generator polynomials. In Method 1, it is assumed that 65536 S-PRS sequence IDs are used and information of [16] bits is used, but in the disclosure, the number of S-PRS sequence IDs is not limited to a specific value. When $2^Y$ S-PRS sequence ID are used, it may be determined as $$N_{ID} = N_{ID}^{X} \bmod 2^{Y}.$$

In method 2, it is assumed that a PSCCH, that is, the 1st SCI and the 2nd SCI are transmitted in a slot in which the S-PRS is transmitted. Also, it is assumed that a destination ID is included in the 1st SCI or 2nd SCI. The destination ID is assumed to be 16 bits. However, in the disclosure, the destination ID is not limited to 16 bits. If the 1st SCI or 2nd SCI is not transmitted in every slot in which the S-PRS is transmitted, it may be considered to perform an operation based on the destination ID included in the most recently transmitted 1st SCI or 2nd SCI. In method 2, it is assumed that 65536 S-PRS sequence IDs are used and information of 16 bits is used, but in the disclosure, the number of S-PRS sequence IDs is not limited to a specific value. When S-PRS sequence ID information less than 16 bits is required and the destination ID uses 16 bits, the LSB of the destination ID may be used.

In method 3, it is assumed that a PSCCH, that is, the 1st SCI and the 2nd SCI are transmitted in a slot in which the S-PRS is transmitted. Also, it is assumed that a source ID is included in the 1st SCI or 2nd SCI. The source ID is assumed to be 8 bits. However, in the disclosure, the source ID is not limited to 8 bits. If the 1st SCI or 2nd SCI is not transmitted in every slot in which the S-PRS is transmitted, it may be considered to perform an operation based on the source ID included in the most recently transmitted 1st SCI or 2nd SCI. In method 3, it is assumed that 65536 S-PRS sequence IDs are used and information of 16 bits is required. However, in the disclosure, the number of S-PRS sequence IDs is not limited to a specific value. The number of zero bits required may vary depending on the number of required bits of the source ID and the number of bits of the S-PRS sequence ID.

In methods 4 and 5, $N_{ID}$ (S-PRS sequence ID) is (pre-)configured or fixed to a specific value, so difficulties may arise in randomizing $N_{ID}$. in method 6, $N_{ID}$ (S-PRS sequence ID) is separately indicated through the 1st SCI or the 2nd SCI, and the terminal may arbitrarily select and determine the corresponding value. In method 3, it is assumed that 65536 S-PRS sequence IDs are used and information of 16 bits is required. However, in the disclosure, the number of S-PRS sequence IDs is not limited to a specific value.

In addition, a method for determining a sequence group u and a sequence number v in Equation (9) may be determined according to whether group hopping and sequence hopping are performed, and the following method is presented as a method for determining whether group hopping and sequence hopping are performed. In the disclosure, the method for determining whether to perform group hopping and sequence hopping may not be limited to the following methods. Also, one or more of the methods below may be used in combination. Also, one or more of the methods below may be supported and (pre-)configuration of which method is used may be performed.

Method for Determining Group Hopping and Sequence Hopping

In determining group and sequence hopping, in method 1, the determination is fixed to one specific method, and in method 2, the determination is (pre-)configured.

For example, in method 1, one of {'neither', 'groupHopping', and 'sequenceHopping'} may be selected and fixed, or may be (pre-)configured with one of {'neither', 'groupHopping', 'sequenceHopping'} according to Method 2.

In the case of 'neither', neither group hopping nor sequence hopping is performed, and may be expressed by Equation (12) below.

$$f_{gh}(n_{s,f}^{\mu}, l') = 0 \quad (12)$$
$$v = 0$$

In the case of 'groupHopping', only group hopping is performed and sequence hopping is not performed, and this case may be expressed by Equation (13) below.

$$f_{gh}(n_{s,f}^{\mu}, l') = \left(\sum_{m=0}^{7} c\left(8\left(n_{s,f}^{\mu} N_{symb}^{slot} + l_0 + l'\right) + m\right) \cdot 2^m\right) \bmod 30 \quad (13)$$
$$v = 0$$

In Equation (13), c(i) is a pseudorandom sequence presented in Equation (3), and a corresponding value may be initialized as $$c_{init} = n_{ID}^{PRS},$$

and the determination of $$n_{ID}^{PRS}$$

value is referred to the above presented method for determining $$n_{ID}^{PRS}$$

(S-PRS sequence ID).

In the case of 'sequenceHopping', only sequence hopping is performed and group hopping is not performed, and this case may be expressed by Equation (14) below.

$$f_{gh}(n_{s,f}^{\mu}, l') = 0 \quad (14)$$
$$v = \begin{cases} c\left(n_{s,f}^{\mu} N_{symb}^{slot} + l_0 + l'\right) & M_{sc,b}^{SRS} \geq 6N_{sc}^{RB} \\ 0 & \text{otherwise} \end{cases}$$

In Equation (14), c(i) is a pseudorandom sequence presented in Equation (3), and a corresponding value may be initialized as $$c_{init} = n_{ID}^{PRS},$$

and the determination of $$n_{ID}^{PRS}$$

value is referred to the above presented method for determining $$n_{ID}^{PRS}$$

(S-PRS sequence ID). Equation (15) appears below.

$$M_{sc,b}^{PRS} = m_{PRS,b} N_{sc}^{RB} / (K_{TC} P_F) \quad (15)$$

In Equation (15), $$N_{sc}^{RB} = 12.$$

In Equation (10), the value of $m_{PRS,b}$ may be selected from the table below as a value for determining a bandwidth through which the S-PRS is transmitted. However, in the disclosure, the value of $m_{PRS,b}$ is not limited to the values shown in Table 2 below. In other words, depending on a bandwidth over which the S-PRS is transmitted, the specific value of $m_{PRS,b}$ shown in Table 2 below may not be used, or a new value not shown in Table 2 below may be additionally used. From the value of $m_{PRS,b}$, b=$B_{PRS}$ and the value of $B_{PRS} \in \{0, 1, 2, 3\}$ may be determined. $B_{PRS}$ is a parameter that determines how the PRS hops on a frequency axis, and the following may be considered as a method for determining the corresponding value. In the disclosure, the value of $B_{PRS}$ is not limited to 0, 1, 2, 3. The method for determining $B_{PRS}$ is not limited to the method presented below. One or more of the methods below may be used in combination and may be supported and (pre-)configured.

Method for Determining $B_{PRS}$

In determining $B_{PRS}$, in method 1, $B_{PRS}$ is fixed to a specific value, and in method 2, one value is (pre-)configured.

For example, in method 1, $B_{PRS}$=0, which may always be fixed. Alternatively, according to Method 2, it may be (pre-)configured with one of $B_{PRS} \in \{0, 1, 2, 3\}$. To determine the value of $m_{PRS,b}$ in Table 3 below, the value of $C_{PRS} \in \{0, 1, \ldots, 63\}$ should be determined. The following may be considered as a method for determining $C_{PRS}$. In the disclosure, the value of $C_{PRS}$ is 0, 1, 2, . . . 63, but not limited to thereto.

Method for Determining $C_{PRS}$

In determining $C_{PRS}$, method 1 provides that one value is (pre-)configured, method 2 provides that a range of available $C_{PRS}$ values is (pre-)configured, and method 3 provides that when one or more values are configured, the terminal may select one value and indicate the selected value to another terminal.

Various methods such as 1st SCI, 2nd SCI, SL MAC-CE, PC5-RRC may be used to indicate a corresponding value.

The range of $C_{PRS}$ values that may be used in Method 2 may be determined by the priority of the terminal and a channel busy ratio (CBR). Table 3 appears as follows.

TABLE 3

| | $B_{PRS} = 0$ | | $B_{PRS} = 1$ | | $B_{PRS} = 2$ | | $B_{PRS} = 3$ | |
|---|---|---|---|---|---|---|---|---|
| $C_{PRS}$ | $m_{PRS,0}$ | $N_0$ | $m_{PRS,1}$ | $N_1$ | $m_{PRS,2}$ | $N_2$ | $m_{PRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |

TABLE 3-continued

| | $B_{PRS} = 0$ | | $B_{PRS} = 1$ | | $B_{PRS} = 2$ | | $B_{PRS} = 3$ | |
|---|---|---|---|---|---|---|---|---|
| $C_{PRS}$ | $m_{PRS,0}$ | $N_0$ | $m_{PRS,1}$ | $N_1$ | $m_{PRS,2}$ | $N_2$ | $m_{PRS,3}$ | $N_3$ |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 68 | 4 | 4 | 17 | 4 | 1 |
| 63 | 272 | 1 | 16 | 17 | 8 | 2 | 4 | 2 |

for determining $K_{TC}$ in Equation (15), the value of $P_F$ may be determined as 1, 2, or 4. When the value of $P_F$ is determined to be 2 or 4, the terminal may expect that the length of the S-PRS sequence is a multiple of 6. However, in the disclosure, the value of $P_F$ may not be limited to 1, 2, or 4.

Method for Determining $P_F$

In determining $P_F$, in method 1, $P_F$ is fixed to a specific value, and in method 2, one value is (pre-)configured.

For example, in method 1, one of 1, 2, and 4 may be selected and fixed. Alternatively, (pre-)configuration may be performed with one of 1, 2, and 4 according to method 2.

Third Embodiment

The third embodiment presents a method for configuring and transmitting a signal for a terminal to measure a location through an SL.

Whether a terminal can perform positioning through an SL, in other words, whether the terminal is a terminal capable of performing a positioning operation is determined by terminal capability, and the corresponding capability information may be transmitted to other terminals and a base station. In this case, whether the terminal can perform positioning through the SL may be determined by whether or not an SL positioning signal is transmitted/received. The SL positioning signal may be an S-PRS transmitted and received for positioning measurement. For example, a specific SL terminal may perform both transmission and reception of S-PRS. In addition, a specific SL terminal may perform S-PRS transmission, but there may be a terminal unable to perform S-PRS reception. In addition, a specific SL terminal may perform S-PRS reception, but there may be a terminal unable to perform S-PRS transmission. In addition, a specific SL terminal may not be able to perform both transmission and reception of S-PRS. Whether or not such a terminal can transmit/receive S-PRS may be defined as terminal capability. In the disclosure, a S-PRS signal is not limited to a specific signal. For example, a corresponding signal may be an SL synchronization signal or another reference signal defined in an SL. Alternatively, a corresponding signal may be a newly defined reference signal for SL positioning.

Figure 8:
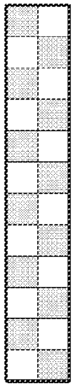
FIGS. 8 and 9 are diagrams for explaining a pattern of an S-PRS, which is a sidelink positioning signal, according to an embodiment.
Figure 8:
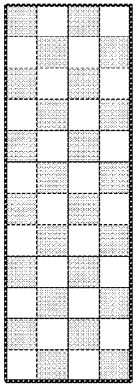
Figure 8:
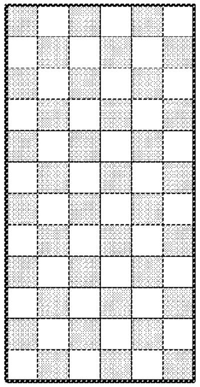
Figure 8:
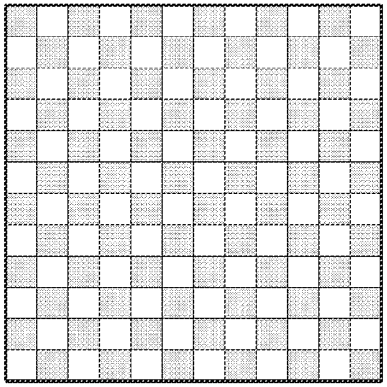
Figure 8:
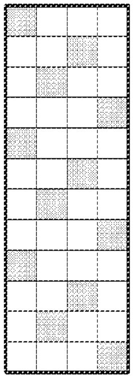
Figure 8:
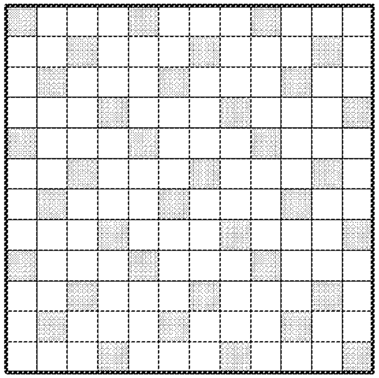
Figure 8:
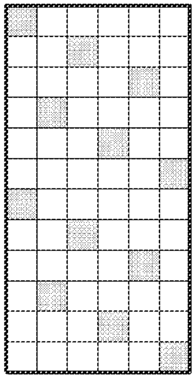
Figure 8:
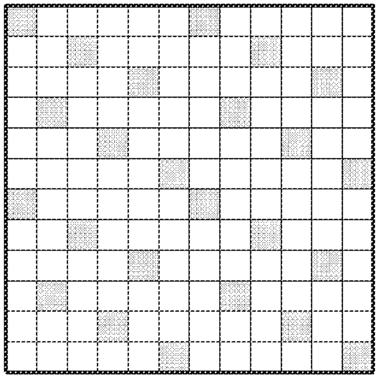
Figure 8:
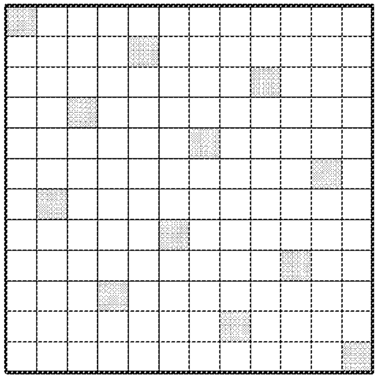

FIG. 8 illustrates a method considering that a DL PRS-based pattern is reused in S-PRS according to an embodiment. In part (a) of FIG. 8, the comb pattern and the number of PRS symbols supported in DL PRS may be reused as S-PRS. In particular, the S-PRS pattern for Comb-2 and the number of PRS symbols=2 is illustrated in part (b) of FIG. 8. The S-PRS pattern for Comb-2 and the number of PRS symbols=4 is illustrated in part (c) of FIG. 8. The S-PRS pattern for Comb-2 and the number of PRS symbols=6 is illustrated in part (d) of FIG. 8. The S-PRS pattern for Comb-2 and the number of PRS symbols=12 is illustrated in part (e) of FIG. 8. The S-PRS pattern for Comb-4 and the number of PRS symbols=4 is illustrated in part (f) of FIG. 8. The S-PRS pattern for Comb-4 and the number of PRS symbols=12 is illustrated in part (g) of FIG. 8. The S-PRS pattern for Comb-6 and the number of PRS symbols=6 is illustrated in part (h) of FIG. 8. The S-PRS pattern for Comb-6 and the number of PRS symbols=12 is illustrated in part (i) of FIG. 8. The S-PRS pattern for Comb-12 and the number of PRS symbols=12 is illustrated in part (j) of FIG. 8. According to FIG. 8, the S-PRS may have various symbol lengths, and the start location and length of a symbol through which the S-PRS is transmitted may be flexibly determined in a slot. In the disclosure, the S-PRS pattern is not limited to the pattern illustrated in FIG. 8.

Figure 9:
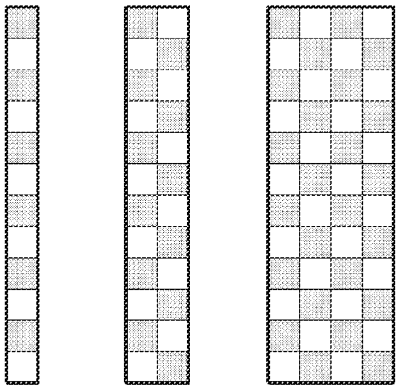
Figure 9:
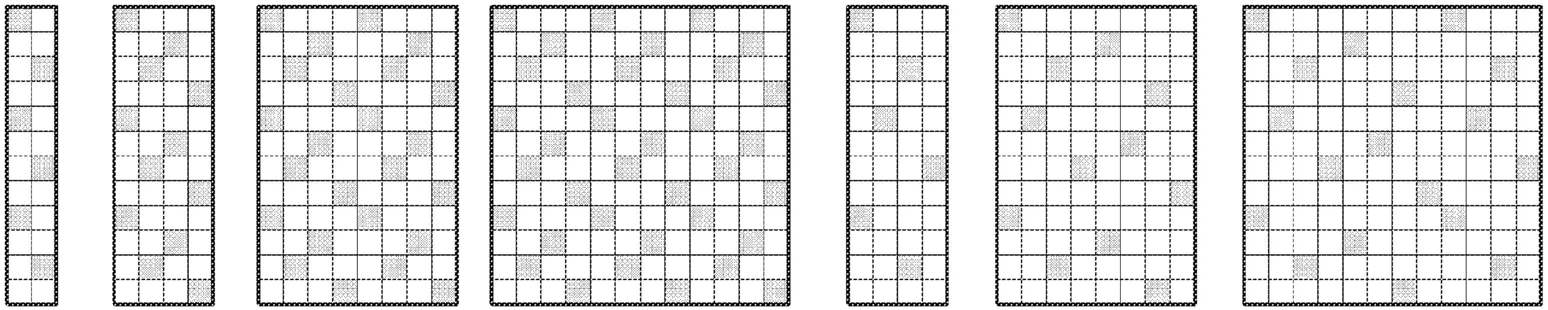

FIG. 9 illustrates a method considering that a UL SRS-based pattern is reused in S-PRS. In part (a) of FIG. 9, the comb pattern and the number of PRS symbols supported in UL SRS may be reused as S-PRS. In particular, the S-PRS pattern for Comb-2 and the number of PRS symbols=1 is illustrated in part (b) of FIG. 9. The S-PRS pattern for Comb-2 and the number of PRS symbols=2 is illustrated in part (c) of FIG. 9. The S-PRS pattern for Comb-2 and the number of PRS symbols=4 is illustrated in part (d) of FIG. 9. The S-PRS pattern for Comb-4 and the number of PRS symbols=2 is illustrated in part (e) of FIG. 9. The S-PRS pattern for Comb-4 and the number of PRS symbols=4 is illustrated in part (f) of FIG. 9. The S-PRS pattern for Comb-4 and the number of PRS symbols=8 is illustrated in part (g) of FIG. 9. The S-PRS pattern for Comb-4 and the number of PRS symbols=12 is illustrated in part (h) of FIG. 9. The S-PRS pattern for Comb-8 and the number of PRS symbols=4 is illustrated in part (i) of FIG. 9. The S-PRS pattern for Comb-8 and the number of PRS symbols=8 is illustrated in part (j) of FIG. 9. The S-PRS pattern for Comb-8 and the number of PRS symbols=12 is illustrated in part (k) of FIG. 9. According to FIG. 9, the S-PRS may have various symbol lengths, and the start location and length of a symbol through which the S-PRS is transmitted may be flexibly determined in a slot. In the disclosure, the S-PRS pattern is not limited to the pattern illustrated in FIG. 9.

Figure 10:
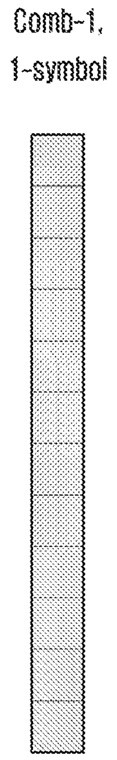
FIG. 10 illustrates a method considering that a comb-1 pattern is used in S_PRS according to an embodiment.

FIG. 10 is a method considering that Comb-1 pattern is used for S-PRS, according to an embodiment. In FIG. 10, with Comb-1 and the number of PRS symbols=1, S-PRS is mapped to all REs on a frequency axis and transmitted. In FIG. 10, a case in which the number of PRS symbols=1 is illustrated, but the number of PRS symbols is not limited thereto. In other words, the Comb-1 S-PRS pattern may be transmitted on one or more symbols.

In the disclosure, it is generally assumed that both Comb-N (N≥1) and the number of symbols M (M≥1) can be used. Also, as illustrated in FIGS. 8 and 9, it is assumed that the comb pattern can be fully staggered or partially staggered across several symbols. The consideration of the staggered pattern can improve positioning accuracy as reference signals are transmitted to all REs of frequency over several symbols.

In addition, a positioning method that can be supported by a terminal may be defined as terminal capability. For example, a method such as SL time difference of arrival (SL-TDOA), SL angle-of-departure (SL-AOD), SL multi-round trip time (SL Multi-RTT), SL round trip time (SL RTT), sidelink E-CID and sidelink angle-of-arrival (SL-AOA) may be considered as a positioning method, and a positioning method supported by a terminal is not limited thereto. A supportable SL positioning method is determined by terminal capability, and corresponding capability information may be transmitted to other terminals and a base station.

When a terminal performs positioning through an SL, positioning-related configuration information may be (pre-) configured. For example, S-PRS information may be (pre-) configured as positioning-related information. In particular, the activation/deactivation of S-PRS transmission may be (pre-)configured. When S-PRS transmission is deactivated, even if S-PRS transmission is indicated/requested through a location server (LS) or other terminal, the corresponding terminal may not perform S-PRS transmission. In addition, when the transmission bandwidth (allocation area on a frequency axis) and period (allocation area on a time axis) of the S-PRS may be configured in various ways, the corresponding information may be (pre-)configured. As another example, as described In FIGS. 8 to 9, the number of usable comb patterns, the number of PRS symbols, and location (start symbol) at which the PRS is transmitted in a slot may be (pre-)configured. As another example, information about a positioning method may be (pre-)configured with positioning-related information. For example, the information may be (pre-)configured which positioning methods are available. As the positioning method of the terminal, there may be SL-TDOA, SL-AOD, SL Multi-RTT, SL RTT, Sidelink E-CID, SL-AOA, etc., and the SL positioning method that can be supported is determined by the terminal capability, and the corresponding capability information may be transmitted to other terminals and a base stations. In addition, a usable positioning method among SL positioning methods that can be supported based on the terminal capability may be (pre-)configured.

As discussed with reference to Table 1, when the terminal does not receive positioning configuration from another terminal or an LS, the terminal may comply with positioning configuration information that is pre-configured and then stored therein. For example, in this case, the terminal may be out of a network coverage. As another example, it may be a case in which no positioning-related configuration information is received from any other terminals. After a certain point in time, the terminal may be configured with positioning configuration information from another terminal or an LS. In a case corresponding UE (no LS) or LS (through UE) of Table 1 in which the terminal is configured with positioning information from another terminal, the positioning configuration information may have been transmitted via broadcast, unicast, or groupcast through an SL, and may be indicated by SCI (1st stage SCI or 2nd stage SCI) or, may be indicated through PC5-RRC or an SL MAC-CE. In a case corresponding to LS (through UE) in which the terminal is connected to the LS and the terminal is configured with positioning information from the LS, it may be information indicated from an upper level of the terminal. On the other hand, in a case corresponding to LS (through BS) of Table 1 in which the terminal is configured with positioning configuration information from the LS connected to the base station, the terminal may be configured with positioning configuration information from the base station in a cell-common manner. Here, cell-common may indicate that terminals in a cell receive the same information configuration from a base station. In this case, the terminal may consider a method for receiving an SL-SIB from the base station and obtaining cell-common information. Also, in a case corresponding to LS (through BS) of Table 1 in which the terminal is configured with positioning information from the LS connected to the base station, the terminal may be configured with the corresponding information in a UE-specific manner after an RRC connection with the base station is established.

As described above, when the terminal does not receive positioning configuration from another terminal or an LS, the terminal may transmit or receive a positioning signal according to positioning configuration information that is pre-configured and is then stored therein. After a certain point in time, the terminal may be configured with positioning information from another terminal or an LS. In this case, one or more pieces of information may be configured with. For example, the S-PRS information may be determined such that only one pattern is configured, and it may be allowed to configure one or more pieces of pattern information. When one or more pieces of pattern information is configured, the terminal may transmit the corresponding configuration information to the base station and the LS. The LS may determine an appropriate S-PRS pattern and indicate the determined S-PRS pattern to the terminal. On the contrary, the terminal may determine a pattern used in one or more pieces of S-PRS pattern information and transmit the corresponding information to other terminals by broadcast, unicast, or groupcast through the SL. In this case, the corresponding information may be indicated by SCI (1st stage SCI or 2nd stage SCI) or, may be indicated through PC5-RRC or an SL MAC-CE. As another example, it may be determined that the information about the positioning method is (pre)-configured in only one method, and it may be allowed to (pre)-configure information about one or more positioning methods. The information about the positioning method may include information about whether the method is UE-based or UE-assisted. Alternatively, the information about the positioning method may include information about whether the method is absolute positioning, relative positioning, or ranging. Alternatively, the information about the positioning method may include information about whether the method is SL-TDOA, SL-AOD, SL Multi-RTT, SL E-CID, or SL-AOA. When one or more pieces of pattern information is configured, the terminal may transmit the corresponding configuration information to the base station or the LS. The LS may determine an appropriate positioning method and indicate the determined positioning method to the terminal. On the contrary, the terminal may determine a method used in information about one or more positioning methods and transmit the determined information to other terminals via broadcast, unicast, or group cast through the SL. In this case, the corresponding information may be indicated by SCI (1st stage SCI or 2nd stage SCI) or may be indicated through PC5-RRC or SL MAC-CE.

When the terminal performs positioning through the SL, the terminal may transmit a positioning signal through the SL. The positioning signal may include S-PRS. Methods of transmitting a positioning signal in an SL include transmission of the positioning signal from a PosRef terminal to a target terminal, and transmission of the positioning signal from a target terminal to a PosRef terminal.

Depending on the positioning method used, both the transmission methods may be performed or only one of the two transmission methods may be performed. For example, when SL-TDOA is performed, SL positioning may be performed by transmitting an S-PRS by using the first method. On the other hand, when SL Multi-RTT or SL RTT is performed, both of the S-PRS transmission methods may be required. In FIG. 7, UE-A and UE-B may correspond to a target terminal and a PosRef terminal, respectively. However, in FIG. 7, UE-A and UE-B are not limited to Target UE and PosRef UE, respectively. In other words, UE-A may correspond to a PosRef terminal and UE-B may correspond to a target terminal. In addition, the S-PRS transmitted from the PosRef terminal to the target terminal and the S-PRS transmitted from the target terminal to the PosRef terminal may be positioning signals of the same type or different types of positioning signals.

In the SL, the terminal may perform absolute positioning, relative positioning, or ranging. First of all, as described above, absolute positioning (absolute location) may indicate 2-dimensional (x,y) and 3-dimensional (x,y,z) coordinate location information of the terminal by longitude and latitude. In order for the targe terminal to perform absolute positioning, it may require a plurality of PosRef terminals. In addition, the target terminal needs to receive known location information from the plurality of PosRef terminals for absolute positioning. For example, when the target terminal performs RTT with the plurality of PosRef terminals, there may be a plurality of pairs between the target terminal and one PosRef terminal in FIG. 7. This may be referred to as Multi-RTT. Next, relative positioning (relative location) may indicate relative 2D or 3D location information from other terminals. Therefore, in order for the target terminal to perform relative positioning, as illustrated in FIG. 7, only one PosRef terminal may be required, for example. It is necessary to receive known location information from corresponding PosRef terminals. In addition, by additionally measuring or receiving direction information, the target terminal may find relative 2D or 3D location information from the PosRef terminal. Lastly, ranging may indicate measuring a distance or direction from another terminal. In a case of measuring a distance, for example, as illustrated in FIG. 7, only one PosRef terminal may be required. In addition, in case of only measuring distance or direction from other terminals, there is no need to receive known location information from the PosRef terminals. When the meaning of ranging in the SL includes both distance and direction information, ranging may have the same meaning as relative positioning.

Fourth Embodiment

In the fourth embodiment, the S-PRS patterns illustrated in FIGS. 8, 9 and 10 may be transmitted through an SL resource pool as in Case 1 in which the S-PRS is transmitted together in a resource pool used for SL communication (Shared resource pool), or in Case 2 in which the S-PRS is transmitted in a dedicated resource pool that is distinct from a resource pool used for SL communication.

In Case 1, the S-PRS shares a pool in a resource pool used for SL communication, that is, a pool in which PSCCH/PSSCH is transmitted. In a fourth embodiment, a method for transmitting an S-PRS and a terminal operation are disclosed in consideration of Case 1.

Since S-PRS transmission is allowed in a resource pool used for SL communication in Case 1, S-PRS transmission should be considered in consideration of the existing physical layer structure, that is, channels and signals included in SL slots. According to Case 1, the PSCCH/PSSCH and S-PRS for SL communication (data transmission) will be mixed in the corresponding pool. In Case 1, the following Cases 1A, 2A and 3A may be considered from the point of view of terminal transmission. In addition, the channels and signals included in the SL slot may vary depending on which case is supported.

In Case 1A, a terminal transmits only data in a shared resource pool (S-PRS is not transmitted). In Case 2A, a terminal transmits only S-PRS in a shared resource pool (data is not transmitted). In Case 3A, a terminal transmits both data and S-PRS in a shared resource pool.

Case 1A refers to an existing SL communication.

Figure 11:
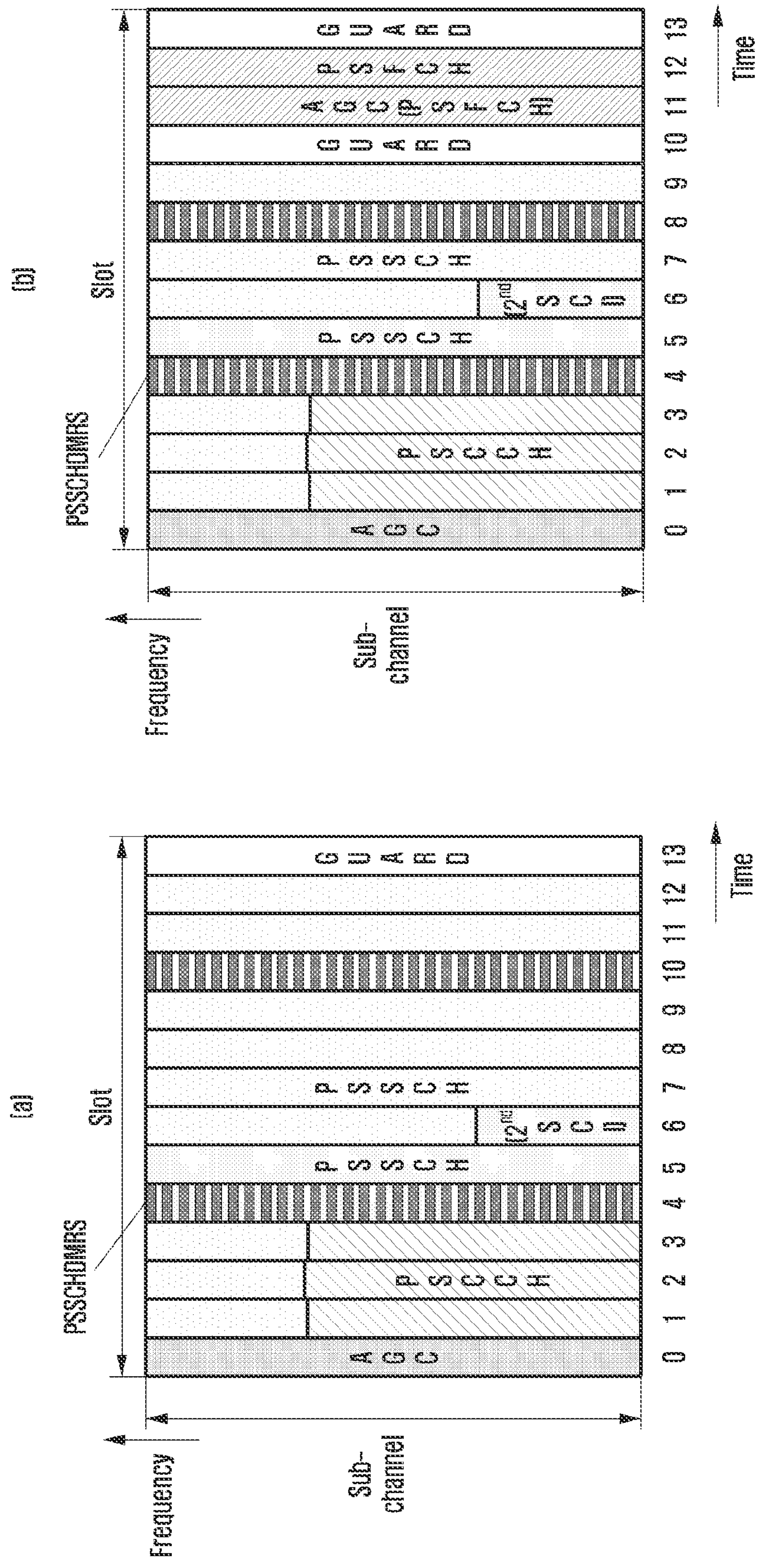
FIG. 11 illustrates an example of a physical layer structure used for sidelink communication according to an embodiment.

FIG. 11 illustrates an example of an existing physical layer structure according to an embodiment. In part (a) of FIG. 11, an example of an SL physical layer structure is illustrated when a physical sidelink feedback channel (PSFCH) is not transmitted or in a slot in which a PSFCH is not transmitted. In this case, the terminal may transmit the $1^{st}$ SCI through the PSCCH, transmit the $2^{nd}$ SCI in the PSSCH area, and transmit data in the PSSCH area. In part (b) of FIG. 11, an example of an SL physical layer structure in a slot in which a PSFCH is transmitted is illustrated. Similar to part (a) of FIG. 11, the terminal may transmit the $1^{st}$ SCI through the PSCCH, transmit the $2^{nd}$ SCI in the PSSCH area, and transmit data in the PSSCH area.

In Case 2A, data is not transmitted, but the PSCCH ($1^{st}$ SCI) and $2^{nd}$ SCI may be transmitted for required control information while transmitting S-PRS. In the case of $2^{nd}$ SCI, it may be defined as a new $2^{nd}$ SCI format that includes control information necessary for S-PRS transmission. In Case 2A, there needs to be addressed to where in the SL slot the S-PRS transmitted (Issue 1), and how to handle the PSSCH area when data is not transmitted (Issue 2).

Issue 2 above will be discussed in more detail in a sixth embodiment below.

Figure 12A:
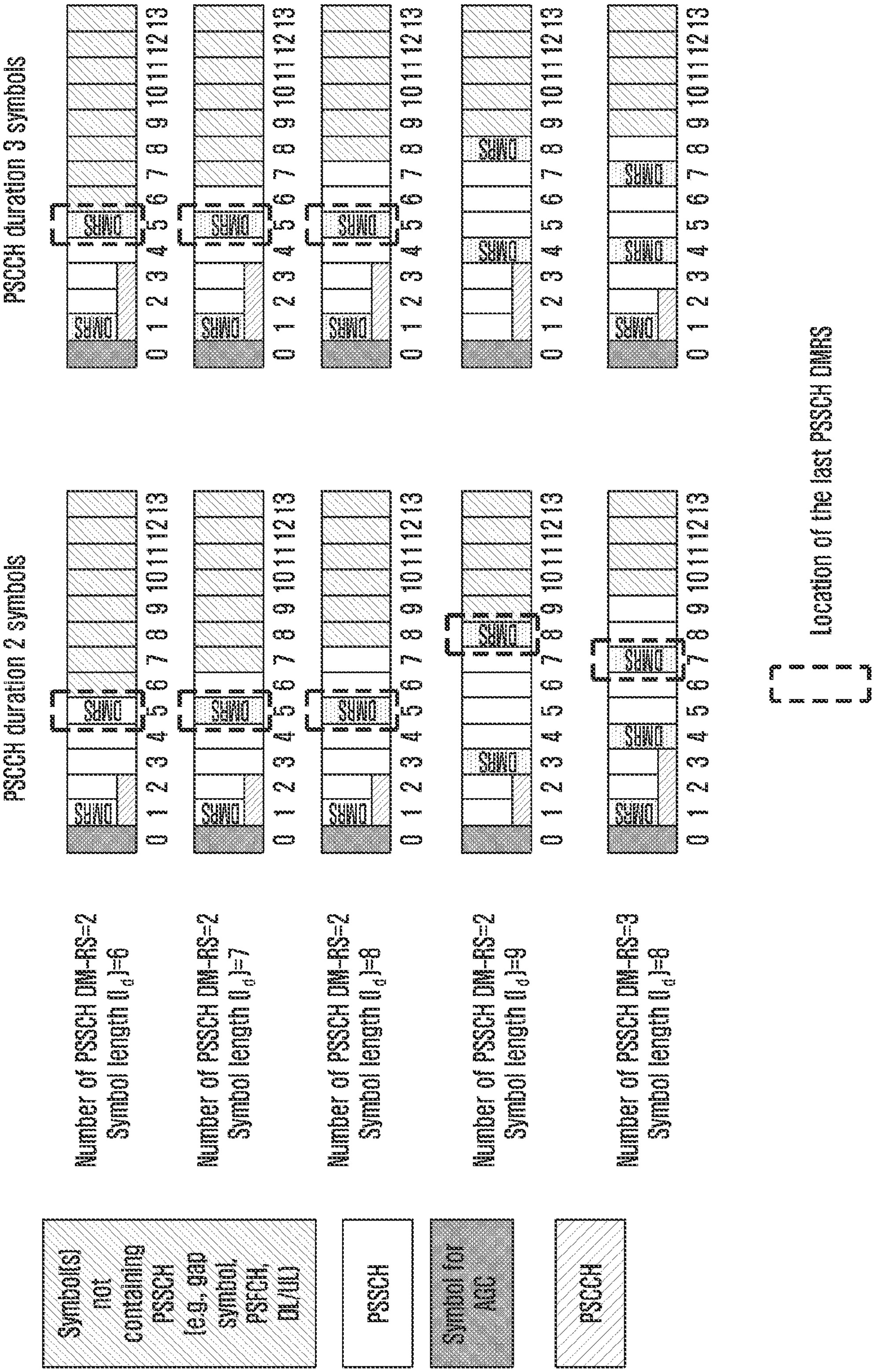
FIG. 12A illustrates a method for mapping an S-PRS by avoiding a location where an existing signal is transmitted in a PSSCH area according to an embodiment.
Figure 12B:
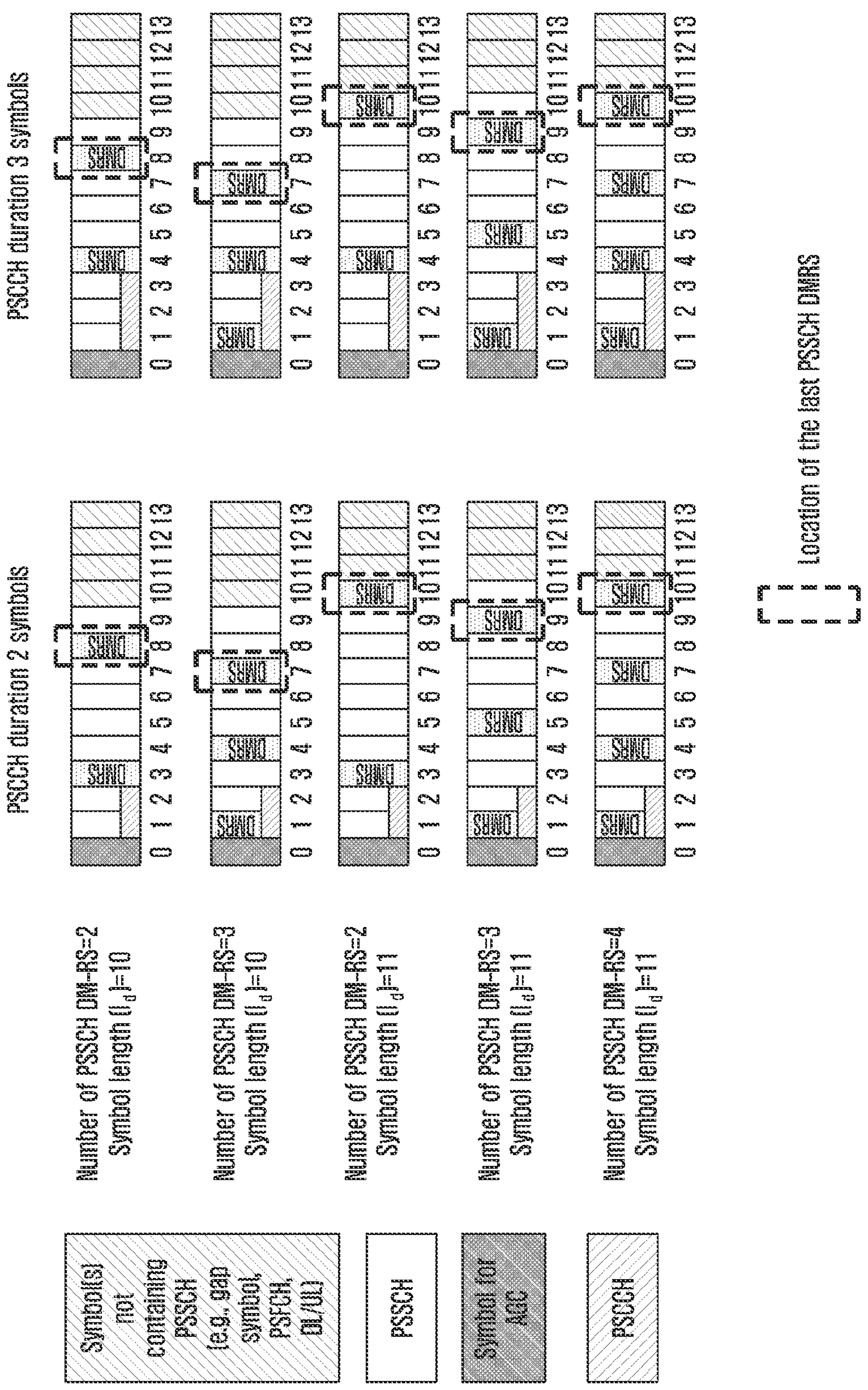
FIG. 12B illustrates a method for mapping an S-PRS by avoiding a location where an existing signal is transmitted in a PSSCH area according to an embodiment.
Figure 12C:
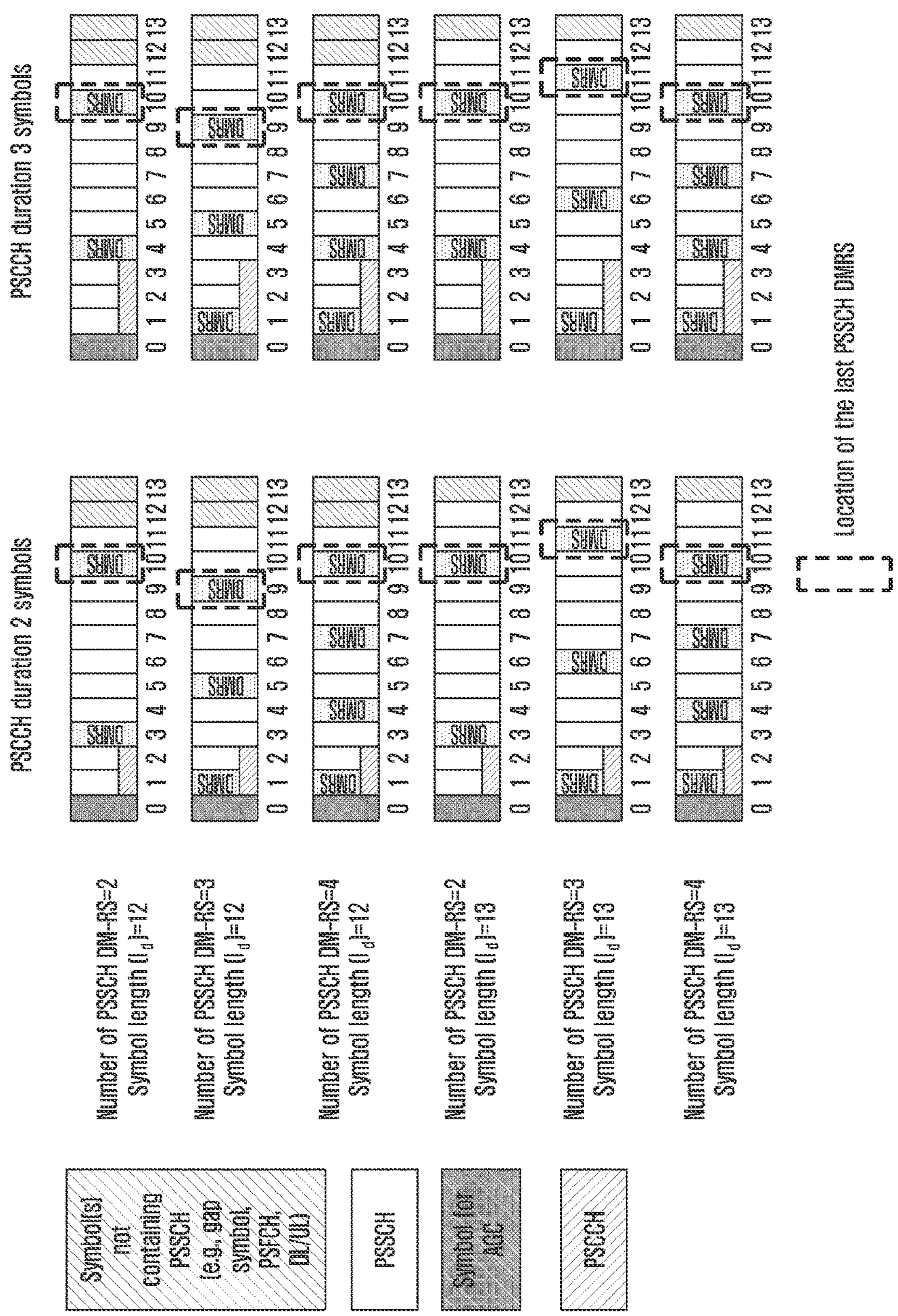
FIG. 12C illustrates a method for mapping an S-PRS by avoiding a location where an existing signal is transmitted in a PSSCH area according to an embodiment.

FIG. 12A illustrates a method for mapping an S-PRS by avoiding a location where an existing signal is transmitted in a PSSCH area according to an embodiment. FIG. 12B illustrates a method for mapping an S-PRS by avoiding a location where an existing signal is transmitted in a PSSCH area according to an embodiment. FIG. 12C illustrates a method for mapping an S-PRS by avoiding a location where an existing signal is transmitted in a PSSCH area according to an embodiment. Specifically, FIGS. 12A, 12B and 12C regards how to handle Issue 1. In FIG. 12A, a location where a last PSSCH DMRS occurs is at a $5^{th}$, $7^{th}$ or $8^{th}$ DMRS. In FIG. 12B, a location where a last PSSCH DMRS occurs is at a $7^{th}$, $8^{th}$, $9^{th}$ or $10^{th}$ DMRS. In FIG. 12C, a location where a last PSSCH DMRS occurs is at a $9^{th}$, $10^{th}$ or $11^{th}$ DMRS.

In FIGS. 12A, 12B and 12C, a possible physical layer structure in which PSCCH/PSSCH is transmitted for SL communication (data transmission) is illustrated. a PSCCH duration may be configured to 2 symbols or 3 symbols. In addition, the symbol length ($l_d$) of an area in which the PSCCH/PSSCH is transmitted, including an AGC symbol, may be configured from 6 to 13. the number of PSSCH DMRS symbols may be configured from 2 to 4, and the number of supported symbols may be limited according to the symbol length ($l_d$) as illustrated in FIGS. 12A, 12B and 12C. Considering that the S-PRS is mapped avoiding the location where the existing signal is transmitted in the PSSCH area, the most desirable location criterion may be the last PSSCH DMRS symbol. This is because the first PSSCH DMRS symbol has a symbol duration transmitted by FDM with the PSCCH, so if the S-PRS is transmitted in the corresponding portion, the S-PRS may not be transmitted in all allocated frequency domains, and because the 2nd SCI may be mapped from the first PSSCH DMRS symbol. In FIGS. 12A, 12B and 12C, there is a space in which the S-PRS can be transmitted from a minimum of 1 symbol to a maximum of 6 symbols before the last PSSCH DMRS symbol.

Figure 12D:
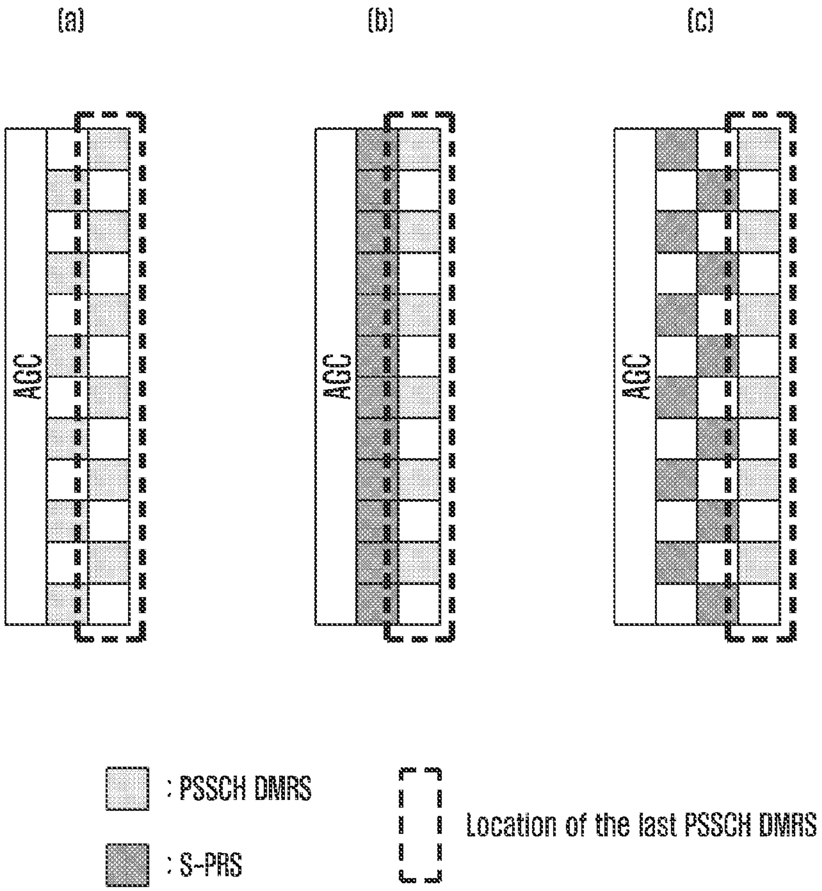
FIG. 12D illustrates a method for transmitting the S-PRS based on the location where the last PSSCH DMRS symbol is transmitted, according to an embodiment.

FIG. 12D illustrates a method for transmitting the S-PRS based on the location where the last PSSCH DMRS symbol is transmitted, according to an embodiment. In FIG. 12D, reference may be made to the corresponding symbol location indicated in FIGS. 12A, 12B and 12C, with reference to a possible physical layer structure in which PSCCH/PSSCH is transmitted for SL communication (data transmission). When the 2nd SCI is mapped from the first PSSCH DMRS symbol to the S-PRS symbol illustrated in part (a), part (b) and part (c) FIG. 12D, it is noted that the 2nd SCI may not be mapped to an RE through which the PSSCH DMRS is transmitted and an RE through which the S-PRS is In a method using the PSSCH DMRS, as illustrated in part (a)FIG. 12D, one more PSSCH DMRS symbols are placed before the last PSSCH DMRS symbol. In this case, since the PSSCH DMRS is a Comb-2 pattern, when one more PSSCH DMRS symbol is located before the last PSSCH DMRS symbol, comb offset=1 is applied to the pattern to perform one RE shift as illustrated in part (a)FIG. 12D. Through this, positioning may be performed through the reference signal transmitted to all REs over two symbols. The S-PRS added before the last PSSCH DMRS symbol may be interpreted as a new reference signal. In addition, since the corresponding S-PRS is formed using the PSSCH DMRS, the S-PRS sequence may be generated according to Equation (7) in the first embodiment. When the terminal transmits only the S-PRS in the shared resource pool and does not transmit data according to Case 2A, an automatic gain control (AGC) symbol may be required as illustrated in part (a) FIG. 12D. in addition, the AGC symbol may be generated by duplicating the reference signals of all REs transmitted in the last PSSCH DMRS symbol and the S-PRS symbol added before the last PSSCH DMRS symbol. However, when Issue 2 above and the corresponding method herein are used, the AGC symbol may not be used.

In a method that does not use PSSCH DMRS, this method transmits only one S-PRS symbol before the last PSSCH DMRS symbol. As illustrated in part (b)FIG. 12D, an S-PRS of Comb=1 may be transmitted before the last PSSCH DMRS symbol. For a method for generating a sequence of the corresponding S-PRS, the above first and second embodiments are referred. According to Case 2A, when the terminal transmits only the S-PRS in the shared resource pool and does not transmit data, the automatic gain control (AGC) symbol may be required as illustrated in part (b)FIG. 12C. Also, as illustrated in part (b)FIG. 12D, the AGC symbol may be generated by duplicating the reference signals of all REs transmitted in the S-PRS symbol. However, when Issue 2 above and thus the method proposed in the sixth embodiment are used, the AGC symbol may not be used.

The third method is the "same" as the second method, but transmits two or more S-PRS symbols before the last PSSCH DMRS symbol. FIG. 12D part (c) illustrates when two symbols of PRS (Comb-2) are transmitted, but is not limited thereto. In other words, the S-PRS pattern of two or more symbols presented in the third embodiment may be transmitted before the last PSSCH DMRS symbol. For a method for generating a sequence of the corresponding S-PRS, the above first and second embodiments are referred. When the terminal transmits only the S-PRS in the shared resource pool and does not transmit data according to Case 2, the AGC symbol may be required as illustrated in part (c)FIG. 12D. The AGC symbol may be generated by duplicating reference signals of all REs transmitted in S-PRS symbols. However, when Issue 2 above and thus the corresponding method in the sixth embodiment are used, the AGC symbol may not be used.

In Case 3A' the PSCCH (1st SCI) and the 2nd SCI may be transmitted for control information required while transmitting both data and S-PRS. In the case of 2nd SCI, it can be defined as a new 2nd SCI format that includes control information necessary for S-PRS transmission and information necessary for data transmission. In Case 3A, as in Case 2A, it requires to determine where the S-PRS is transmitted in an SL slot, and the method disclosed in Case 2A may be applied.

According to Case 1, when SL communication (data transmission) is performed and the S-PRS is transmitted in the shared resource pool, it requires to indicate whether to transmit the S-PRS in the PSSCH area. This is because terminals that transmit the S-PRS and terminals that do not transmit the S-PRS may co-exist in the shared resource pool. The terminal receiving SL communication (data transmission) and the S-PRS will be able to successfully decode and receive data and S-PRS through the corresponding information. The corresponding information may be indicated through the PSCCH (1st SCI) or 2nd SCI. Specific indication information may vary depending on how the three cases described above are supported. In particular, the three cases described above may be supported in a Combination 1 in which Case 1A+Case 2A are supported, a Combination 2 in which Case 1A+Case 3A are supported, and a Combination 3 in which Case 1A+Case 2A+Case 3A are supported.

In the case of Combination 1 or Combination 2, only whether or not the S-PRS is transmitted may be indicated with 1-bit information. However, in the case of Combination 3, 2-bit information may be used to indicate whether only the S-PRS is transmitted, only data is transmitted, or both S-PRS and data are transmitted. In the disclosure, when the transmission is indicated through the PSCCH (1st SCI), an example of how the transmission can be specifically indicated through reserved bits is presented in Table 4 below. In the disclosure, a method for indicating whether the S-PRS is transmitted through the PSCCH (1st SCI) is not limited to the method shown in Table 4 below.

TABLE 4

| |
|---|
| - Reserved - a number of bits as determined by the following: |
| - $N_{reserved}$ bits as configured by higher layer parameter sl-NumReservedBits, with value set to zero, if higher layer parameter indicationUEBScheme2 is not configured, or if higher layer parameter indicationUEBScheme2 is configured to 'Disabled', or if higher layer parameter S-PRS is not configured; |
| - ($N_{reserved}$ − 1) bits, with value set to zero, if higher layer parameter indicationUEBScheme2 is configured and 'Enabled' but higher layer parameter S-PRS is not configured; |
| - ($N_{reserved}$ − 2) bits otherwise, with value set to zero. |
| - Conflict information receiver flag - 0 or 1 bit |
| - 1 bit if higher layer parameter indicationUEBScheme2 is configured to 'Enabled', where the bit value of 0 indicates that the UE cannot be a UE to receive conflict information and the bit value of 1 indicates that the UE can be a UE to receive conflict information as defined in Clause 16.3.0 of [5, TS 38.213]; |
| - 0 bit otherwise. |
| - S-PRS presence flag - 0 or 1 bit |
| - 1 bit if higher layer parameter S-PRS is configured and UE transmits S-PRS, |
| - 0 bit otherwise. |

As seen above, Table 4 shows a method for indicating whether or not the S-PRS is transmitted with 1-bit information through the PSCCH (1st SCI) by using a reserved bit. With reference to Table 4, a reserved bit can already be used to indicate the 'Conflict information receiver flag'. According to Case 1, when SL communication (data transmission) and S-PRS transmission are performed in the shared resource pool, it may be (pre-)configured whether S-PRS transmission is allowed in the resource pool. Configuration of S-PRS may be interpreted as allowing S-PRS transmission. In this case, as shown in Table 4, 1 bit of the reserved bit may be used to indicate whether or not the terminal transmits the S-PRS.

Fifth Embodiment

In a third embodiment, the S-PRS patterns illustrated in FIGS. 8 to 10 may be transmitted through an SL resource pool. In addition, the SL resource pool in which the S-PRS is transmitted may be considered in Case 1, in which the S-PRS is transmitted together in a resource pool used for SL communication (Shared resource pool), or in Case 2 in which the S-PRS is transmitted from a dedicated resource pool separate from a resource pool used for SL communication.

The fourth embodiment has disclosed the S-PRS transmission method and the operation of the terminal for Case 1. The fifth embodiment discloses a method for transmitting an S-PRS and an operation of a terminal in consideration of Case 2.

In Case 2, since the S-PRS is transmitted in the time and frequency domains distinct from the resource pool used for SL communication, considering the existing physical layer structure, that is, the channel and signal included in the SL slot, it is not required to determine the location of the S-PRS transmission. In other words, the S-PRS transmission area included in the SL slot and additionally necessary channels and signals may be newly designed. In addition, unlike Case 1, in the dedicated resource pool for S-PRS transmission, PSCCH/PSSCH for SL communication (data transmission) and S-PRS are not mixed, so interference with the data signal does not occur.

Accordingly, the positioning performance can be further improved over Case 1. In the fourth embodiment therefore, in Case 2, unlike in Case 1, only the case in which the terminal transmits only the S-PRS in the dedicated resource pool is considered in terms of terminal transmission. The PSCCH (1st SCI) and the 2nd SCI may be transmitted for control information required while transmitting the S-PRS. In the case of 2nd SCI, it may be defined as a new 2nd SCI format that includes control information necessary for S-PRS transmission. In Case 2, it will be necessary to solve the issues of where the S-PRS is transmitted in the SL slot and how other necessary channels and signals are transmitted.

Figure 13:
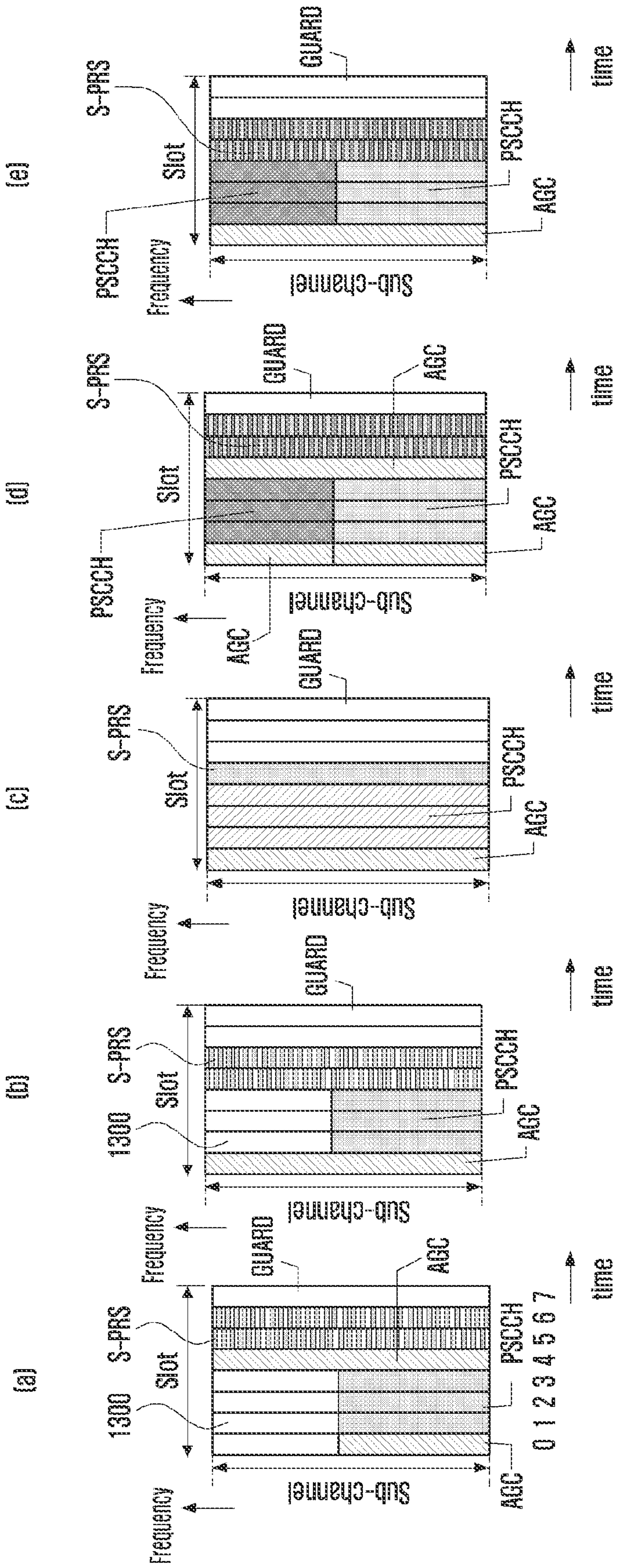
FIG. 13 illustrates a method for determining a location where an S-PRS is transmitted according to an embodiment.

FIG. 13 illustrates a method for determining a location where an S-PRS is transmitted in the Case 2 of the fourth embodiment. The PSCCH (1st SCI) and the S-PRS being transmitted in a dedicated resource pool is illustrated in FIG. 13. However, transmission of other channels and signals may be additionally considered. In addition, in FIG. 13, a case in which a dedicated AGC symbol is allocated is considered, but the dedicated AGC symbol illustrated in FIG. 13 may be omitted assuming that the PSCCH and the S-PRS are transmitted with low modulation. According to the physical layer structure illustrated in FIG. 13, the dedicated resource pool through which the S-PRS is transmitted is configured, and then the number/position of symbols of slots through which the S-PRS is transmitted and the number and location of subchannels are configured. The number/location of symbols in slots through which the S-PRS is transmitted may be (pre-)configured with SL bandwidth part (BWP) information. In addition, the number and location of subchannels through which the S-PRS is transmitted may be (pre-)configured as resource pool information. The PSCCH is transmitted for the purpose of indicating resource allocation information through which the S-PRS is transmitted and for supporting sensing by other terminals through the PSCCH reception. The PSCCH duration (number of PSCCH symbols) and the number of subchannels through which PSCCH is transmitted may be also (pre-)configured with resource pool information. As described in the third embodiment, since the S-PRS is transmitted in various comb patterns unlike transmission of PSSCH, it may be possible for multi-users to transmit the S-PRS while maintaining orthogonality in the same time and frequency domains by applying an offset. In this embodiment, the case in which the S-PRS is transmitted in a Comb-N pattern (N>1) and at least N terminals are orthogonally multiplexed is considered. In Case 1, it may be assumed that the PSSCH is transmitted from the lowest PRB through which the PSCCH is transmitted. Also, in Case 1, it may be assumed that the S-PRS is transmitted from the lowest PRB through which the PSCCH is transmitted. The comb offset of S-PRS may be assumed to be 0. For reference, in the existing PSSCH transmission or the S-PRS transmission according to Case 1, in case in which the number and location of subchannels are configured in a resource pool, the PSSCH and the S-PRS may not be transmitted in all subchannel areas. Unlike this, in Case 2 wherein the number and location of subchannels are configured in the resource pool, it may be assumed that the S-PRS is transmitted to all subchannel areas. This is to improve positioning performance by transmitting the S-PRS in a wide frequency domain. However, the S-PRS is not transmitted in all REs in the frequency domain, but the transmitted resource element (RE) may be determined according to the comb offset. The comb offset value may be included in the PSCCH (1st SCI).

FIG. 13 illustrates examples of a method for determining a location where the S-PRS is transmitted for Case 2. Parts (a), (b), (d), and (e) of FIG. 13 illustrate how the S-PRS of the Comb-2 pattern are transmitted. Part (c) of FIG. 13 illustrates how the S-PRS of the Comb-1 pattern is transmitted.

In parts (a) to (c) of FIG. 13, when the S-PRS is transmitted in a Comb-N pattern, a case in which multiplexing of at least N terminals is not considered, or a case in which multiplexing is allowed, but only one terminal transmits the S-PRS is illustrated. In particular, according to part (a) of FIG. 13, an AGC symbol is transmitted in the first symbol before the frequency domain in which the PSCCH is transmitted. Thus, the first symbol of the PSCCH is duplicated and used as the AGC symbol is illustrated. In a case of using this method, there is an area 1300 in which the PSCCH is not transmitted, so the AGC symbol may be needed again before the symbol in which the S-PRS is transmitted. According to part (b) of FIG. 13, the AGC symbols are transmitted in all areas of the first symbol, and in this case, a case in which S-PRS symbols are duplicated and used as the AGC symbols is illustrated. In a case of using this method, there is the area 1300 in which the PSCCH is not transmitted, but the AGC symbol may be unnecessary again before a symbol in which the S-PRS is transmitted. The 6th symbol in part (b) of FIG. 13 is reserved for comparison with part (a) of FIG. 13 and may not actually exist. According to (c) of FIG. 13, the AGC symbols are transmitted in all areas of the first symbol. Thus, the first symbol of PSCCH is duplicated and used as the AGC symbol or S-PRS symbols are duplicated and used as the AGC symbols is illustrated. In part (c) of FIG. 13, the 6th and 7th symbols are reserved for comparison with part (a) of FIG. 13, and may not actually exist.

In part (d) to part (e) of FIG. 13, cases in which multiplexing of at least N terminals is considered when the S-PRS is transmitted in a Comb-N pattern are illustrated. In part (d) to part (e) of FIG. 13, cases in which S-PRS of a Comb-2 pattern is transmitted and two terminals are orthogonally multiplexed are illustrated. In particular, according to part (d) of FIG. 13, the AGC symbol is transmitted in the first symbol before the frequency domain in which each PSCCH is transmitted, and in this case, a case in which the first symbol of the PSCCH is duplicated and used as the AGC symbol is illustrated. In a case of using this method, the area 1300 in which the PSCCH is not transmitted may occur as illustrated in 1300 in part (a) of FIG. 13, and thus, the AGC symbol may be needed again before the symbol in which the S-PRS is transmitted. According to part (e) of FIG. 13, the AGC symbols are transmitted in all areas of the first symbol, and in this case, a case in which the S-PRS symbols are duplicated and used as the AGC symbols is illustrated. In case of using this method, regardless of whether the area 1300 in which the PSCCH is not transmitted may occur as illustrated in 1300 of part (a) of FIG. 13, the AGC symbol may be unnecessary again before the symbol in which the S-PRS is transmitted. The 6th symbol in part (d) of FIG. 13 is reserved for comparison between part (a) and part (d) of FIG. 13 and may not actually exist.

Sixth Embodiment

In the fourth embodiment, Case 1 in which the S-PRS is transmitted together in a resource pool used for SL communication, and Case 2 in which a terminal transmits only S-PRS in a shared resource pool, were considered. A sixth embodiment discloses a method for Issue 2 (how to handle a PSSCH area when data is not transmitted).

Figure 14:
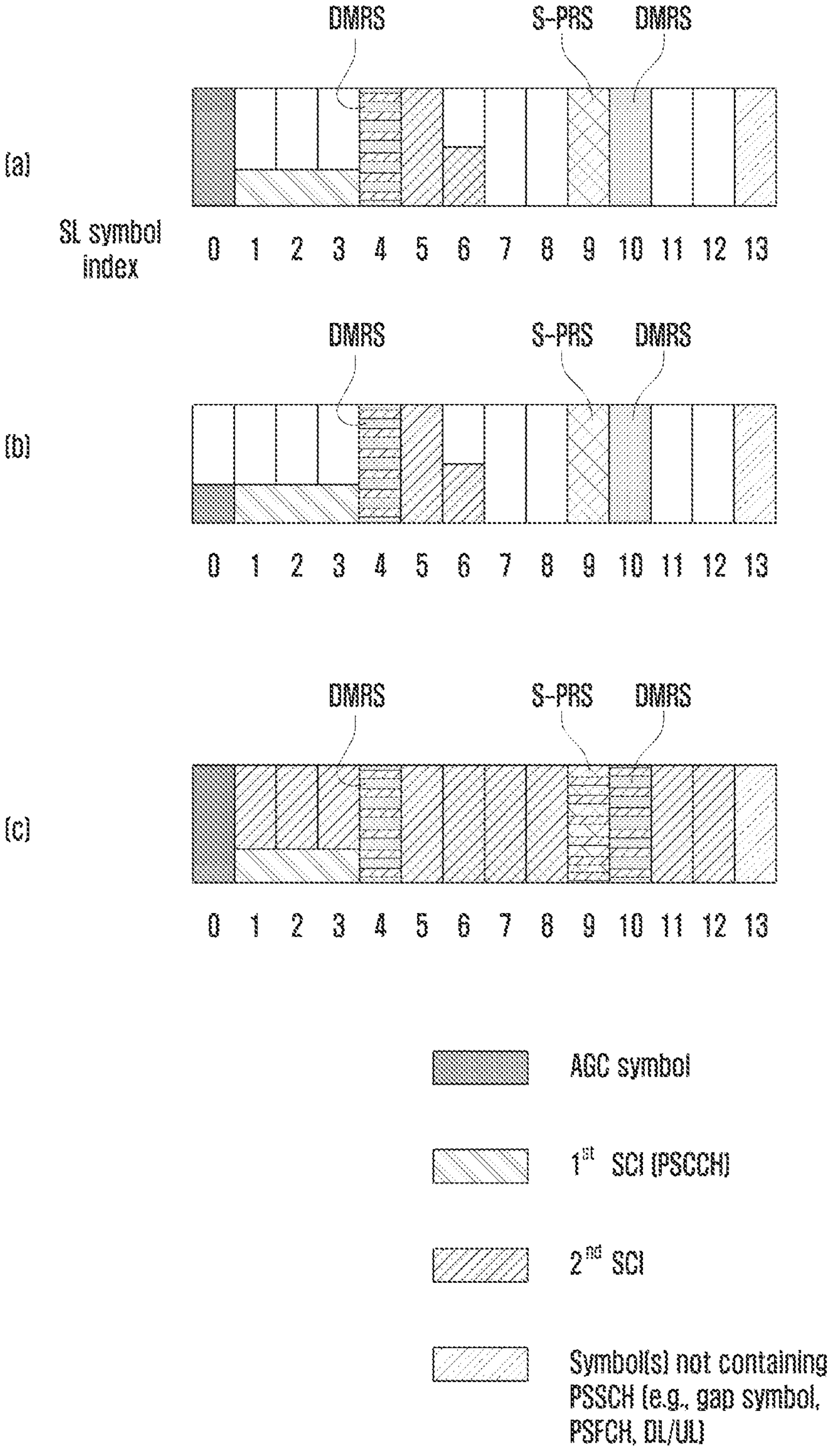
FIG. 14 illustrates a method for processing a PSCSCH area when data is not transmitted according to an embodiment.

FIG. 14 illustrates a method for processing a PSCSCH area when data is not transmitted according to an embodiment.

In part (a) of FIG. 14, an example in which data is transmitted together in a PSSCH area when the 2nd SCI is transmitted through the PSSCH is illustrated. As such, when data is transmitted together in the PSSCH area when the 2nd SCI is transmitted through the PSSCH, the number of bits or symbols $$Q'_{SCI2}$$

in which the 2nd SCI is coded using channel coding may be calculated as in Equation 16 below. In Equation (16) below, symbol index l may be defined based on symbols used to transmit PSCCH/PSSCH except for the first symbol in a slot used for AGC.

$$Q'_{SCI2} = \min\left\{\left\lceil \frac{(O_{SCI2} + L_{SCI2}) \cdot \beta_{offset}^{SCI2}}{Q_m^{SCI2} \cdot R} \right\rceil, \left\lceil \alpha \sum_{l=0}^{N_{symbol}^{PSSCH}-1} M_{sc}^{SCI2}(l) \right\rceil\right\} + \gamma \tag{16}$$

In Equation (16), $O_{SCI2}$ represents the number of bits of information included in the 2nd SCI. The number of bits of information included may vary depending on the 2nd SCI format used. Further in Equation (16), $L_{SCI2}$ uses the number of CRC bits used for the 2nd SCI, and 24 bits may be used, $$\beta_{offset}^{SCI2}$$

is a parameter for adjusting the number of coded bits of the 2nd SCI, and may be determined using a bit field included in the 1st SCI, $$Q_m^{SCI2}$$

represents a modulation degree used for 2nd SCI transmission, where corresponding value may be fixed as QPSK, R represents a coding rate used for 2nd SCI transmission, where the corresponding value may be determined using a bit field included in the 1st SCI, and the coding rate may be the same as the coding rate used for data transmission, $$M_{sc}^{SCI2}(l)$$

is the number of resource elements (REs) used for 2nd SCI transmission at symbol index l, and may be defined as $$M_{sc}^{SCI2}(l) = M_{sc}^{PSSCH}(l) - M_{sc}^{PSCCH}(l),$$

where $$M_{sc}^{PSSCH}(l)$$

represents the number of REs in the bandwidth scheduled for PSSCH transmission at symbol index l, and $$M_{sc}^{PSCCH}(l)$$

represents the numbers of subcarriers used for transmission of PSCCH, PSCCH DMRS, and S-PRS at symbol index l, that is, the number of REs, $$N_{symbol}^{PSSCH}$$

represents the number of symbols through which PSSCH is transmitted and may be defined as $$N_{symbol}^{PSSCH} = N_{symbol}^{sh} - N_{symbol}^{PSFCH},$$

which may be defined as $$N_{symbol}^{sh} = sl\text{-}lengthSymbols\text{-}2,$$

sl-lengthSymbols is the number of symbols used as an SL, and one of the values {7,8,9,10,11,12,13,14} may be configured in an upper layer, and a is a value used as a parameter for determining the amount to which 2nd SCI is mapped, and may be a value configured in an upper layer.

2 is subtracted from sl-lengthSymbols when determining the value of $$N_{symbol}^{sh}$$

so as to consider the first AGC symbol and last gap symbol of the slot.

$$N_{symbol}^{PSFCH}$$

may be determined as $$N_{symbol}^{PSFCH} = 3$$

in a slot in which PSFCH is transmitted and as $$N_{symbol}^{PSFCH} = 0$$

in a slot in which PSFCH is not transmitted.

When the 2nd SCI is mapped, if there is an RE remaining in the RB of the (OFDM or SC-FDMA) symbol to which the last symbol is mapped (i.e., an RE to which the 2nd SCI is not mapped) among the symbols generated (modulation) by coding the 2nd SCI, γ is a variable determined so that the 2nd SCI is mapped to all remaining REs of the corresponding RB.

On the contrary, an example of a case in which data is not transmitted together in the PSSCH area when the 2nd SCI is transmitted through the PSSCH is illustrated in part (b) of FIG. 14, compared to part (a) of FIG. 14. In a case where data is not transmitted in the PSSCH area and the 2nd SCI is mapped to the PSSCH area according to Equation (16), as illustrated in part (b) of FIG. 14, if the 2nd SCI is mapped only to a part of the frequency domain of the PSSCH in the last symbol in which the 2nd SCI is transmitted, power imbalance may occur between the corresponding symbol and the previous symbol(s) to which the 2nd SCI is mapped. In other words, in the previous symbol(s) to which the 2nd SCI is mapped, all of the 2nd SCI is transmitted in the frequency domain of the PSSCH, but in the last symbol to which the 2nd SCI is transmitted, only a part of the frequency domain of the PSSCH is mapped, so that the power of the inter-symbol transmission signal may not be constant. When such a power imbalance occurs, difficulties may occur in transmitting and receiving signals. In addition, the automatic gain control (AGC) symbols are not secured, which may cause difficulties in AGC. To solve this problem, the disclosure proposes a method for differently operating the mapping of the 2nd SCI when data is transmitted together in the PSSCH area and when data is not transmitted together in the PSSCH area.

In particular, part (c) of FIG. 14 illustrates an example of transmitting the 2nd SCI so that the $2^{nd}$ SCI is all mapped to the remaining area of the PSSCH when control information is not transmitted along with the data when transmitting the control information through the 2nd SC. It is noted that the disclosure is not limited to the method illustrated in part (c) of FIG. 14. In a case of using this method, unlike Equation (16) in which, data is not transmitted together in the PSSCH area when the 2nd SCI is transmitted through the PSSCH, the number of bits or symbols $$Q'_{SCI2}$$

in which the 2nd SCI is coded using channel coding may be calculated as in Equation (17) below.

$$Q'_{SCI2} = \sum_{l=0}^{N_{symbol}^{PSSCH}-1} M_{sc}^{SCI2}(l) \tag{17}$$

In Equation (17), $$M_{sc}^{SCI2}(l)$$

is the number of resource elements (REs) used for 2nd SCI transmission at the lth symbol of a slot and may be defined as $$M_{sc}^{SCI2}(l) = M_{sc}^{PSSCH}(l) - M_{sc}^{PSCCH}(l),$$

where $$M_{sc}^{PSSCH}(l)$$

represents the number of REs in the bandwidth scheduled for PSSCH transmission at the lth symbol of a slot, and $$M_{sc}^{PSCCH}(l)$$

represents the numbers of subcarriers used for transmission of PSCCH, PSCCH DMRS, and S-PRS at the lth symbol of a slot, that is, the number of $$REs, \text{ and } N_{symbol}^{PSSCH}$$

represents the number of symbols through which PSSCH is transmitted and may be defined as $$N_{symbol}^{PSSCH} = N_{symbol}^{sh} - N_{symbol}^{PSFCH},$$

which may be defined $$\text{as } N_{symbol}^{sh} = sl\text{-}lengthSymbols - 2,$$

sl-lengthSymbols−2, sl-lengthSymbols is the number of symbols used as an SL, and one of the values {7,8,9,10,11, 12,13,14} may be configured in an upper layer.

2 is subtracted from sl-lengthSymbols when determining the value of $$N_{symbol}^{sh}$$

so as to consider the first AGC symbol and last gap symbol of the slot.

$$N_{symbol}^{PSFCH}$$

may be determined as $$N_{symbol}^{PSFCH} = 3$$

in a slot in which PSFCH is transmitted and as $$N_{symbol}^{PSFCH} = 0$$

in a slot in which PSFCH is not transmitted.

It is noted that Equation (17) can be derived by configuring a large value of $$\beta_{offset}^{SCI2},$$

configuring the value of α to 1, and configuring the value of γ to 0 in Equation (16). In other words, the above method may be interpreted as configuring a large value of $$\beta_{offset}^{SCI2},$$

configuring the value of α to 1, and configuring the value of γ to 0 in Equation (16).

According to part (c) of FIG. 14, power imbalance and AGC issues that may occur in part (b) of FIG. 14 can be solved by transmitting the 2nd SCI to be mapped to all remaining areas of the PSSCH. In part (c) of FIG. 14, when the 2nd SCI is mapped, a method in which the 2nd SCI is mapped from the first symbol of the PSSCH area and transmitted so that the 2nd SCI is sequentially mapped to all areas of the PSSCH may be considered. Unlike this, as a method for mapping the 2nd SCI, a method in which the 2nd SCI is mapped from a symbol where the first DMRS of the PSSCH area starts, is mapped to the last symbol of the PSSCH, and then is mapped from the first symbol of the PSSCH area to all areas of the PSSCH may be considered. Also, it is noted that according to Equations (16) and (17) and part (c) of FIG. 14, the 2nd SCI is not mapped to the RE through which the S-PRS is transmitted.

As described with reference to part (c) of FIG. 14, a case in which data is not transmitted but the 2nd SCI is transmitted in a slot may be referred to as 'standalone 2nd SCI', but it is noted that this name can be different.

In the case of SL data transmission, the number of bits transmitted through the PSSCH may be determined by a subchannel size in a frequency axis of configured SL transmission, the number of subchannels, the number of symbols in a time axis, and a resource allocation result. In particular, the subchannel information on the frequency axis of the SL may be (pre-)configured as resource pool information and may have a value in which the subchannel size may be (pre-)configured as one value of {10, 12, 15, 20, 25, 50, 75, 100} PRBs, the number of sub channels may be (pre-) configured as one value of {1, . . . ,27}, or the start location of the subchannel may be (pre-)configured as one value of {0 . . . 265}.

Symbol information on the time axis of the SL may be (pre-)configured as SL BWP information and may have a value in which the symbol length may be (pre-)configured as one value of {7, 8, 9, 10, 11, 12, 13, 14} PRBs, or the start location of a symbol may be (pre-)configured as one value of {0, 1, 2, 3, 4, 5, 6, 7}.

When allocating resources, a terminal selects one slot having the configured SL symbol length. In this case, the frequency resource may be allocated only to at least one subchannel or one or more consecutive subchannels with the configured subchannel size. In addition, in the case of SL data transmission, LDPC coding is used. Unlike this, the 2nd SCI is transmitted using the polar coding, and since the amount of control information is limited compared to the case of SL data transmission, there may be restrictions on the number of bits (K) after rate matching. In particular, CRC may be added to information included in the 2nd SCI, polar coding may be performed, and rate matching may be performed. However, since K has a value of K=4096 after rate matching and the 2nd SCI is only modulated with QPSK, assuming this, a restriction that control information can be assigned to up to 2048 REs may occur.

Therefore, assuming the case of data transmission described above, when resource allocation is performed for standalone 2nd SCI transmission (i.e., a case in which 2nd SCI is not transmitted together with SL data), a case in which it is impossible to perform the polar coding using the 2nd SCI with a limited K value may occur. For example, it is assumed that the subchannel size is configured to 25 PRB and the symbol length is configured to 14. As the example illustrated in FIG. 6, when considering AGC symbol 1, Gap symbol 1, PSCCH transmission symbol 2, DMRS transmission symbol 2, etc., a case in which the number of required REs becomes approximately 2700 REs and exceeds 2048 REs may occur. To solve this problem, the following alternatives may be considered but are not limited thereto In Alternative 1, the subchannel size for standalone 2nd SCI transmission may be (pre-)configured independently of the subchannel size for the existing SL data transmission.

In Alternative 2, when the number of subchannels on the frequency axis, the number of subchannels, the number of symbols on the time axis, and the number of REs according to the result of resource allocation are greater than 2048 in the SL transmission by the conventional scheme, the number of REs is adjusted not to exceed 2048 by adjusting the number of symbols for standalone 2nd SCI transmission.

In Alternative 3, when the number of subchannels on the frequency axis, the number of subchannels, the number of symbols on the time axis, and the number of REs according to the result of resource allocation are greater than 2048 in the SL transmission by the conventional scheme, the number of REs is adjusted not to exceed 2048 by adjusting the number of REs on the frequency axis of standalone 2nd SCI transmission.

In Alternative 4, the number of bits (K) after rate matching of polar coding used in the 2nd SCI transmission is increased.

Alternative 1 is a method of limiting the subchannel size configured during standalone 2nd SCI transmission and using a small number of subchannel sizes. In the disclosure, the subchannel size that can be configured during standalone 2nd SCI transmission is not limited to a specific value. As an example, the following method may be considered.

In the case of standalone 2nd SCI transmission, the subchannel size may be (pre-)configured as one value of {10, 12, 15} PRBs.

In this manner, in a case of limiting to use a small number of subchannel sizes, it may prevent a case in which the number of allocated REs exceeds 2048 REs due to a large subchannel size. Apparently, to this end, when allocating resources, the terminal needs to adjust the number of subchannels allocated as actual resources in the configured number of subchannels so that the number of allocated REs does not exceed 2048 REs.

In Alternative 2, the number of symbols of standalone 2nd SCI transmission is adjusted so that the number of REs does not exceed 2048 when in the SL transmission configured to the terminal by the conventional scheme, the number of subchannels on the frequency axis, the number of subchannels, the number of symbols on the time axis, and the number of REs according to the result of resource allocation are greater than 2048. In particular, when the number of REs does not exceed 2048, standalone 2nd SCI may be mapped and transmitted to all symbols of SL transmission as illustrated in part (c) of FIG. 14. However, when the number of REs exceeds 2048, standalone 2nd SCI may be mapped and transmitted only in some symbols so that the number of REs does not exceed 2048 in symbols capable of SL transmission.

In Alternative 3, the number of REs on the frequency axis of standalone 2nd SCI transmission is adjusted so that the number of REs does not exceed 2048 when in the SL transmission configured to the terminal by the conventional scheme, the number of subchannels on the frequency axis, the number of subchannels, the number of symbols on the time axis, and the number of REs according to the result of resource allocation are greater than 2048. In particular, when the number of REs does not exceed 2048, standalone 2nd SCI may be mapped and transmitted to all subchannels used for resource allocation. However, when the number of REs exceeds 2048, standalone 2nd SCI may be mapped and transmitted only in some frequency REs so that the number of REs does not exceed 2048 from the lowest subchannel index. For example, even when the number of allocated subchannels is two, standalone 2nd SCI may be mapped and transmitted only to some frequency REs (e.g., from lower RE on the frequency axis) at the first subchannel index.

Alternative 4 is a method for increasing the number of bits (K) after rate matching of polar coding used in the 2nd SCI transmission. An issue presented in this embodiment can be solved when a large K value is introduced in consideration of the subchannel size on the frequency axis, the number of subchannels, and the number of symbols on the time axis in SL transmission.

However, since the K value used in the polar coding of the existing Uu (DL or UL) is 8192, only up to K=8192 may be considered in the SL to maintain the same constraints in implementation.

Seventh Embodiment

A seventh embodiment discloses a method for configuring an S-PRS comb offset and an S-PRS muting pattern among parameters that can be configured for transmitting S-PRS in an SL.

Figure 15:
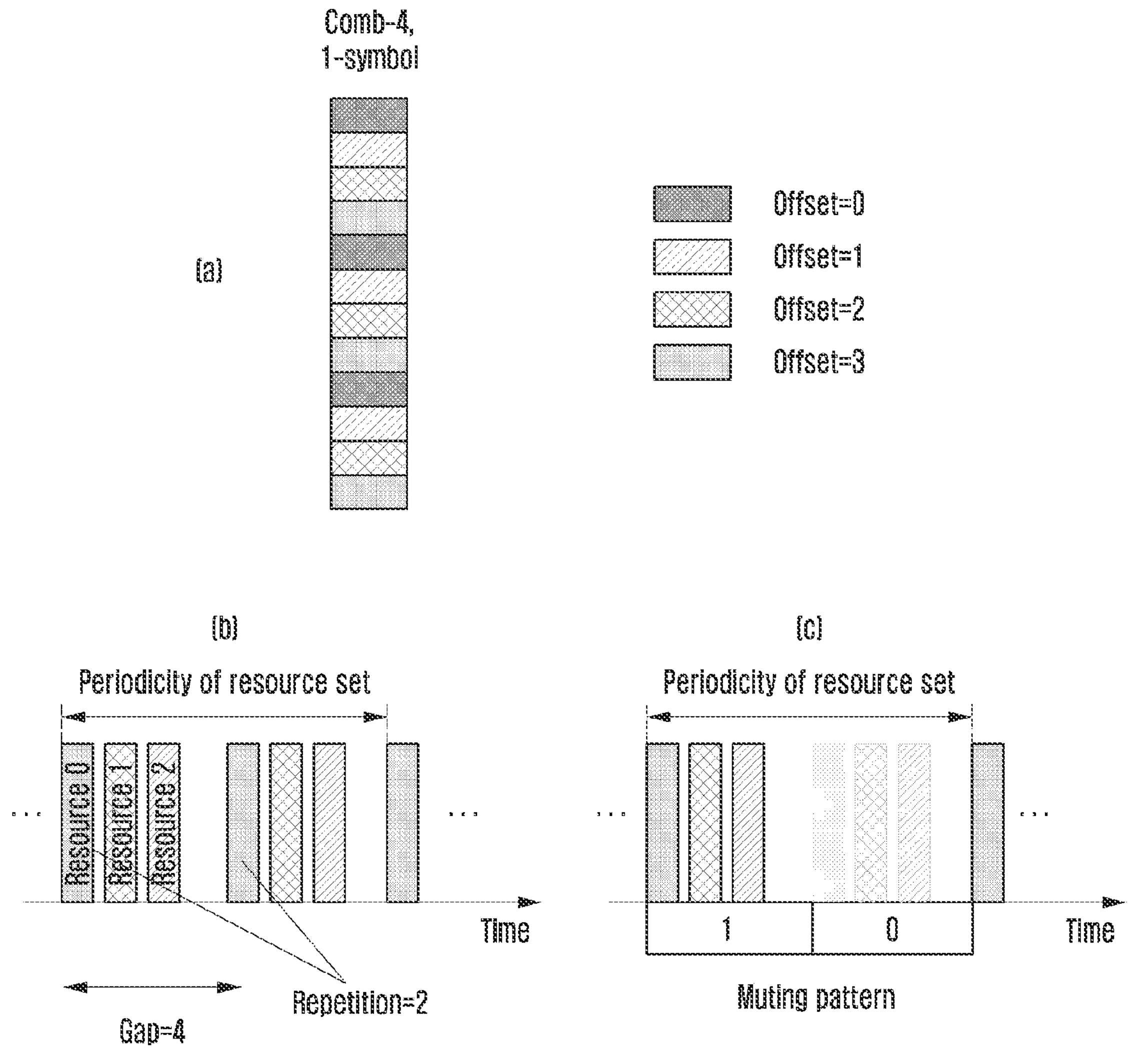
FIG. 15 illustrates a comb offset and a muting pattern during S-PRS transmission according to an embodiment.

FIG. 15 illustrates a comb offset and a muting pattern during S-PRS transmission according to an embodiment. Part (a) of FIG. 15 illustrates S-PRS comb offset, and illustrates an example in which it is Comb-4 and S-PRS is transmitted in one symbol. In the case of Comb-N, there may be N offset values, and the location where S-PRS is transmitted may vary according to the offset value. With reference to part (a) of FIG. 15, a case in which it is Comb-4 and S-PRS is transmitted to another resource element (RE) depending on which value the offset value is 0,1,2,3 is illustrated. In this embodiment, the following methods are proposed as a method for determining a comb offset during S-PRS transmission. For details on combSize below, the third embodiment is referred. However, in the disclosure, the value for combSize is not limited to a specific value. In addition, in the disclosure, the method for determining the S-PRS comb offset is not limited to the method disclosed below.

Method for Determining an S-PRS Comb Offset

In determining an S-PRS comb offset, in method 1, the S-PRS comb offset is determined by the $\lfloor \log_2 \text{combSize} \rfloor$ bits LSB of CRC of the corresponding 1st SCI.

in method 2, the S-PRS comb offset is determined by the $\lfloor \log_2 \text{combSize} \rfloor$ bits LSB of destination ID carried in the $1^{st}$ or $2^{nd}$ SCI.

In method 3, the S-PRS comb offset is determined by the $\lfloor \log_2 \text{combSize} \rfloor$ bits of the source ID carried in the $1^{st}$ or $2^{nd}$ SCI.

In method 4, the S-PRS comb offset is determined by a (pre-)configured value.

In method 5, the S-PRS comb offset is determined into a fixed value (i.e., zero).

In method 6, the S-PRS comb offset is determined by the $\lfloor \log_2 \text{combSize} \rfloor$ bits in the 1st or 2nd SCI.

In method 1, it is assumed that a PSCCH, that is, the 1st SCI is transmitted in a slot in which the S-PRS is transmitted. However, if the PSCCH is not transmitted in every slot in which the S-PRS is transmitted, it may be considered to perform an operation based on the most recently transmitted PSCCH, that is, the 1st SCI. In method 1, it may be determined as $$N_{ID} = N_{ID}^{X} \bmod 2^{Y}.$$

Here, $Y = \lfloor \log_2 \text{combSize} \rfloor$, $$N_{ID}^{X} = \sum_{i=0}^{L-1} p_i \cdot 2^{L-1-i},\ L = 24,$$

and the value p represents parity bits $p_0, p_1, p_2, p_3, \ldots, p_{L-1}$ used for calculation of CRC of PSCCH, and may be generated by cyclic generator polynomials.

In method 2, it is assumed that a PSCCH, that is, the 1st SCI and the 2nd SCI are transmitted in a slot in which the S-PRS is transmitted, and that a destination ID is included in the 1st SCI or 2nd SCI. The destination ID is assumed to be 16 bits. However, in the disclosure, the destination ID is not limited to 16 bits. If the 1st SCI or 2nd SCI is not transmitted in every slot in which the S-PRS is transmitted, it may be considered to perform an operation based on the destination ID included in the most recently transmitted 1st SCI or 2nd SCI.

In method 3, it is assumed that a PSCCH, that is, the 1st SCI and the 2nd SCI are transmitted in a slot in which the S-PRS is transmitted, and that a source ID is included in the 1st SCI or 2nd SC. The source ID is assumed to be 8 bits. However, in the disclosure, the source ID is not limited to 8 bits. If the 1st SCI or 2nd SCI is not transmitted in every slot in which the S-PRS is transmitted, it may be considered to perform an operation based on the source ID included in the most recently transmitted 1st SCI or 2nd SCI.

In methods 4 and 5, a PRS comb offset is (pre-)configured or fixed to a specific value, so difficulties may arise in randomizing the offset value. In method 6, the PRS comb offset is separately indicated through the 1st SCI or the 2nd SCI, and the terminal may arbitrarily select and determine the corresponding value.

Part (b) and part (c) of FIG. 15 illustrate a muting pattern during the S-PRS transmission, and when a resource set for S-PRS transmission is configured and three resources (Resource 0, 1, 2) for S-PRS transmission is configured in the resource set. A transmission period for a resource set for S-PRS transmission is configured, and resources in the set may be transmitted for each period. In addition, the S-PRS may be repeated within the transmission period. With reference to part (b) of FIG. 15, a case in which the S-PRS is repeated within a transmission period is illustrated. In particular, a case in which Repetition factor=2 is configured is illustrated. In addition, the case in which Gap=4 is configured to indicate the location of repetition is illustrated. However, if many terminals transmit the S-PRS in the SL as illustrated in part (b) of FIG. 15, collision and interference may occur. To prevent the collision and interference, a muting pattern may be introduced and the S-PRS may not be transmitted at the original time of S-PRS transmission or by a muting pattern. With reference to part (c) of FIG. 15, a case in which at the time of S-PRS transmission when the muting pattern is configured to 1, the S-PRS is transmitted according to the existing S-PRS configuration, and at the time of S-PRS transmission when the muting pattern is configured to 0, the S-PRS is muted and is not transmitted is illustrated. In this embodiment, the following methods are proposed as a method for determining a muting pattern during S-PRS transmission. In the following, the value for mutingPatternLength is not limited to a specific value. In addition, the method for determining the S-PRS muting pattern in the disclosure is not limited to the method proposed below. Also, one or more of the methods below may be used in combination. Also, one or more of the methods below may be supported and (pre-)configuration of which method is used may be performed.

Method for Determining a S-PRS Muting Pattern

In determining the S-PRS muting pattern, in method 1, the S-PRS muting pattern is determined by the $\lfloor \log_2 \text{mutingPatternLength} \rfloor$ bits LSB of CRC of the corresponding 1st SCI.

In method 2, the S-PRS muting pattern is determined by the $\lfloor \log_2 \text{mutingPatternLength} \rfloor$ bits LSB of destination ID carried in the 1st or 2nd SCI.

In method 3, the S-PRS muting pattern is determined by the $\lfloor \log_2 \text{mutingPatternLength} \rfloor$ bits of the source ID carried in the 1st or 2nd SCI.

In method 4, the S-PRS muting pattern is determined by a (pre-)configured value.

In method 5, the S-PRS muting pattern is determined into a fixed value (i.e., zero).

In method 6, the S-PRS muting pattern is determined by the $\lfloor \log_2 \text{mutingPatternLength} \rfloor$ bits in the 1st or 2nd SCI.

In method 1, it is assumed that a PSCCH, that is, the 1st SCI is transmitted in a slot in which the S-PRS is transmitted. However, if the PSCCH is not transmitted in every slot in which the S-PRS is transmitted, it may be considered to perform an operation based on the most recently transmitted PSCCH, that is, the 1st SC. In method 1, it may be determined as $$N_{ID} = N_{ID}^{X} \bmod 2^{Y}.$$

Here, $Y = \lfloor \log_2 \text{mutingPatternLength} \rfloor$, $$N_{ID}^{X} = \sum_{i=0}^{L-1} p_i \cdot 2^{L-1-i},\ L = 24,$$

and the value p represents parity bits $p_0, p_1, p_2, p_3, \ldots, p_{L-1}$ used for calculation of CRC of PSCCH, and may be generated by cyclic generator polynomials.

In method 2, it is assumed that a PSCCH, that is, the 1st SCI and the 2nd SCI are transmitted in a slot in which the S-PRS is transmitted. Also, it is assumed that a destination ID is included in the 1st SCI or 2nd SCI. The destination ID is assumed to be 16 bits. However, in the disclosure, the destination ID is not limited to 16 bits. If the 1st SCI or 2nd SCI is not transmitted in every slot in which the S-PRS is transmitted, it may be considered to perform an operation based on the destination ID included in the most recently transmitted 1st SCI or 2nd SCI.

In method 3, it is assumed that a PSCCH, that is, the 1st SCI and the 2nd SCI are transmitted in a slot in which the S-PRS is transmitted. It is assumed that a source ID is included in the 1st SCI or 2nd SCI. The source ID is assumed to be 8 bits. However, in the disclosure, the source ID is not limited to 8 bits. If the 1st SCI or 2nd SCI is not transmitted in every slot in which the S-PRS is transmitted, it may be considered to perform an operation based on the source ID included in the most recently transmitted 1st SCI or 2nd SCI.

In methods 4 and 5, the muting pattern is (pre-)configured or fixed to a specific value, and thus difficulties may arise in randomizing the muting pattern. In method 6,the muting pattern is separately indicated through the 1st SCI or the 2nd SCI, and the terminal may arbitrarily select and determine the corresponding value.

Figure 16:
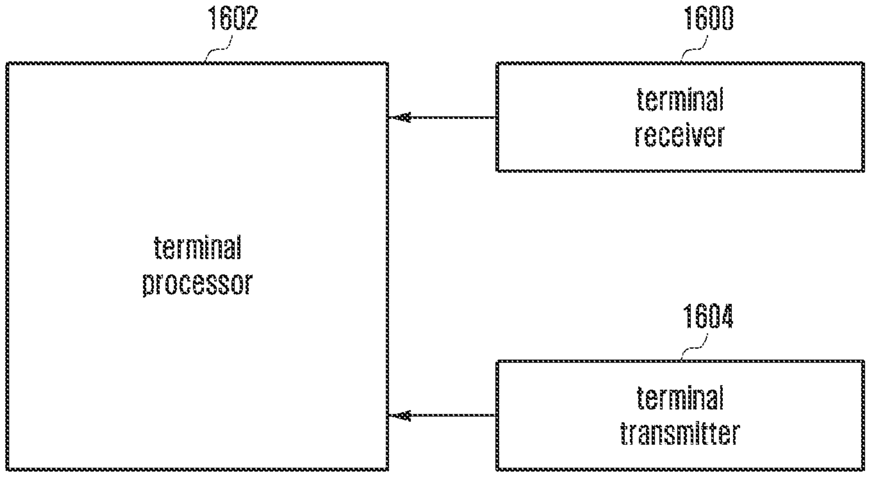
FIG. 16 is a block diagram illustrating an internal structure of a UE, according to an embodiment.

FIG. 16 illustrates an internal structure of a terminal according to an embodiment. As illustrated in FIG. 16, the terminal may include a terminal receiver 1600, a terminal transmitter 1604, and a terminal processor 1602. The terminal receiver 1600 and the terminal transmitter 1604 may be collectively referred to as a transceiver. The transceiver may transmit and receive signals to and from the base station. The signal may include control information and data. To this end, the transceiver may include an RF transmitter for up-converting and amplifying a frequency of a signal being transmitted, and an RF receiver for low-noise-amplifying a received signal and down-converting a frequency of the received signal, The transceiver may receive a signal through a radio channel, output the signal to the terminal processor 1602, and transmit a signal output from the terminal processor 1602 through a radio channel. The terminal processor 1602 may control a series of operations to allow the terminal to operate according to the above-described embodiments.

Figure 17:
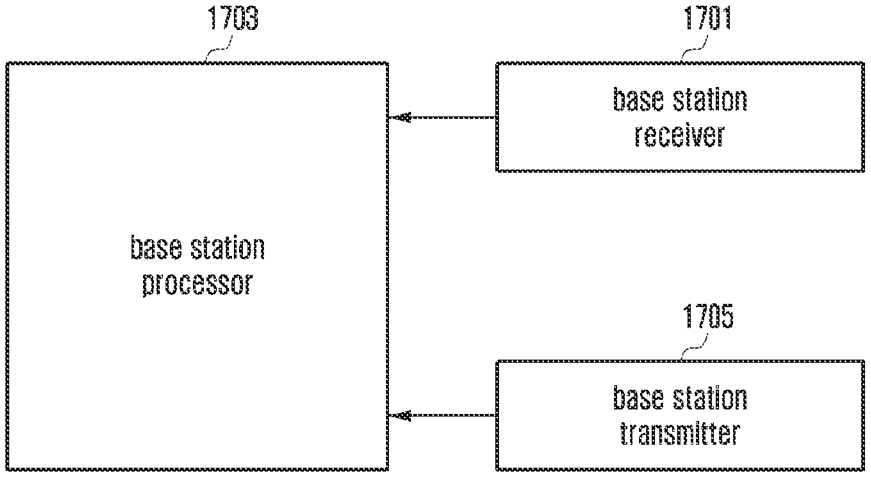
FIG. 17 is a block diagram illustrating an internal structure of a base station, according to an embodiment.

FIG. 17 illustrates an internal structure of a base station according to an embodiment. As illustrated in FIG. 17, the base station may include a base station receiver 1701, a base station transmitter 1705, and a base station processor 1703. The base station receiver 1701 and the base station transmitter 1705 may be collectively referred to as a transceiver. The transceiver may transmit and receive signals to and from a terminal. The signal may include control information and data. To this end, the transceiver may include an RF transmitter for up-converting and amplifying a frequency of a signal being transmitted, and an RF receiver for low-noise-amplifying a received signal and down-converting a frequency of the received signal. Also, the transceiver may receive a signal through a radio channel, output the signal to the base station processor 1703, and transmit a signal output from the base station processor 1703 through a radio channel. The base station processor 1703 may control a series of operations to allow the base station to operate according to the above-described embodiments.

Each block and combinations of blocks in the flowchart illustrations may be implemented by computer program instructions. Because these computer program instructions may be loaded into a processor of a general-purpose computer, special purpose computer, or other programmable data processing equipment, the instructions, which are executed via the processor of the computer or other programmable data processing equipment generate means for implementing the functions specified in the flowchart block(s). Because these computer program instructions may also be stored in a computer-executable or computer-readable memory that may direct the computer or other programmable data processing equipment to function in a particular manner, the instructions stored in the computer-executable or computer-readable memory may produce an article of manufacture including instruction means for performing the functions specified in the flowchart block(s). Because the computer program instructions may also be loaded onto a computer or other programmable data processing equipment, a series of operational steps may be performed on the computer or other programmable data processing equipment to produce a computer implemented process, and thus, the instructions executed on the computer or other programmable data processing equipment may provide steps for implementing the functions specified in the flowchart block (s).

Each block may also represent a module, segment, or portion of code, which includes one or more executable instructions for implementing specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

While the disclosure has been illustrated and described with reference to various embodiments of the present disclosure, those skilled in the art will understand that various changes can be made in form and detail without departing from the spirit and scope of the present disclosure as defined by the appended claims and their equivalents.

What is claimed is:

1. A method performed by a first terminal in a wireless communication system supporting sidelink (SL), the method comprising:

identifying that an SL positioning reference signal (PRS) sequence identifier (ID) for generation of an SL-PRS is not obtained from a higher layer of the first terminal;

generating the SL-PRS sequence ID based on 12 least significant bits (LSBs) of a cyclic redundancy check (CRC) for a physical sidelink control channel (PSCCH) associated with the SL-PRS;

generating the SL-PRS based on the generated SL-PRS sequence ID; and transmitting the generated SL-PRS to a second terminal.

2. The method of claim 1, further comprising:

receiving positioning configuration information from a location server via a positioning protocol.

3. The method of claim 1, further comprising:

transmitting the positioning configuration information to the second terminal via a positioning protocol.

4. The method of claim 1, wherein the SL-PRS sequence ID is set in a range of 0 to 4095.

5. A method performed by a second terminal in a wireless communication system supporting sidelink (SL), the method comprising:

generating an SL positioning reference signal (PRS) sequence identifier (ID) for a first terminal based on 12 least significant bits (LSBs) of a cyclic redundancy check (CRC) for a physical sidelink control channel (PSCCH) associated with an SL PRS;

receiving the SL-PRS from the first terminal; and generating information associated with positioning of the second terminal based on the SL-PRS sequence ID and the SL-PRS.

6. The method of claim 5, wherein the information associated with positioning of the second terminal includes an absolute position value of the second terminal.

7. The method of claim 5, further comprising:

transmitting, to a location server, the information associated with positioning of the second terminal, wherein the information associated with positioning of the second terminal includes a measurement value for positioning of the second terminal.

8. The method of claim 5, wherein obtaining the SL-PRS sequence ID is performed as reception from a location server via a positioning protocol.

9. A first terminal in a wireless communication system supporting sidelink (SL), the first terminal comprising:

a transceiver; and a processor operably coupled with the transceiver and configured to:

identify that an SL positioning reference signal (PRS) sequence identifier (ID) for generation of the SL-PRS is not obtained from a higher layer of the first terminal, generate the SL-PRS sequence ID based on 12 least significant bits (LSBs) of a cyclic redundancy check (CRC) for a physical sidelink control channel (PSCCH) associated with the SL-PRS, generate the SL-PRS based on the generated SL-PRS sequence ID, and transmit the generated SL-PRS to a second terminal.

10. The first terminal of claim 9, wherein the processor is further configured to:

receive positioning configuration information from a location server via a positioning protocol.

11. The first terminal of claim 9, wherein the processor is further configured to:

transmit positioning configuration information to the second terminal via a positioning protocol.

12. A second terminal in a wireless communication system supporting sidelink (SL), the second terminal comprising:

a transceiver; and a processor operably coupled with the transceiver and configured to:

generate an SL positioning reference signal (PRS) sequence identifier (ID) for a first terminal based on 12 least significant bits (LSBs) of a cyclic redundancy check (CRC) for a physical sidelink control channel (PSCCH) associated with an SL PRS, receive the SL-PRS from the first terminal, and generate information associated with positioning of the second terminal based on the SL-PRS sequence ID and the SL-PRS.

13. The second terminal of claim 12, wherein the information associated with the positioning of the second terminal includes an absolute position value of the second terminal.

14. The second terminal of claim 12, wherein the processor is further configured to:

transmit, to a location server, the information associated with positioning of the second terminal, wherein the information associated with positioning of the second terminal includes a measurement value for the positioning of the second terminal.

15. The second terminal of claim 12, wherein obtaining the SL-PRS sequence ID is performed as reception from a location server via a positioning protocol.

* * * * *